(12) United States Patent
Hayashi

(10) Patent No.: US 11,376,740 B2
(45) Date of Patent: Jul. 5, 2022

(54) AUTONOMOUSLY ACTING ROBOT THAT RECOGNIZES DIRECTION OF SOUND SOURCE

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 368 days.

(21) Appl. No.: 16/283,819

(22) Filed: Feb. 25, 2019

(65) Prior Publication Data

US 2019/0184567 A1     Jun. 20, 2019

Related U.S. Application Data

(63) Continuation of application No. PCT/JP2017/030063, filed on Aug. 23, 2017.

(30) Foreign Application Priority Data

Aug. 29, 2016    (JP) ............................. JP2016-166976

(51) Int. Cl.
*B25J 9/16*      (2006.01)
*G10L 25/51*     (2013.01)
(Continued)

(52) U.S. Cl.
CPC .............. *B25J 9/1694* (2013.01); *B25J 5/007* (2013.01); *B25J 9/1664* (2013.01);
(Continued)

(58) Field of Classification Search
CPC ........ B25J 9/1694; B25J 9/1664; B25J 5/007; B25J 11/0005; B25J 13/003; B25J 9/1697;
(Continued)

(56) References Cited

U.S. PATENT DOCUMENTS

| 6,792,406 B1 | 9/2004 | Fujimura et al. |
| 9,598,076 B1 | 3/2017 | Jain et al. |
| | (Continued) | |

FOREIGN PATENT DOCUMENTS

| CN | 1551047 A | 12/2004 |
| CN | 202781159 U | 3/2013 |
| | (Continued) | |

OTHER PUBLICATIONS

Office Action in CN Application No. 201780052742.0, dated May 18, 2020, 18pp.
(Continued)

*Primary Examiner* — Khoi H Tran
*Assistant Examiner* — Nhi Q Bui
(74) *Attorney, Agent, or Firm* — Hauptman Ham, LLP

(57) ABSTRACT

A robot detects a voice using a microphone array, and identifies a sound source direction. The robot directs a head portion in the sound source direction. When an object including characteristics as a voice emitting body is detected in a filming region of a sound source direction identified using the microphone array, the voice emitting body is identified as a voice emission source. When a voice emitting body is identified as a voice emission source, the robot directs a body toward a sound source (emission source). When a special environmental sound is detected, a predetermined motion is executed.

20 Claims, 11 Drawing Sheets

(51) Int. Cl.
  *B25J 13/00* (2006.01)
  *H04R 3/00* (2006.01)
  *G10L 25/78* (2013.01)
  *B25J 11/00* (2006.01)
  *H04R 1/40* (2006.01)
  *B25J 5/00* (2006.01)

(52) U.S. Cl.
  CPC ......... *B25J 11/0005* (2013.01); *B25J 13/003* (2013.01); *G10L 25/51* (2013.01); *G10L 25/78* (2013.01); *H04R 1/40* (2013.01); *H04R 3/00* (2013.01)

(58) Field of Classification Search
  CPC ........ B25J 9/1674; B25J 9/163; B25J 9/0003; B25J 5/00; B25J 11/008; B25J 13/08; B25J 13/00; B25J 19/023; G01L 25/51; G01L 25/78; H04R 1/40; H04R 3/00; A61B 3/113; A61B 34/37; A61B 34/2055; A61B 2017/00207; A61B 2017/00203; A61B 5/11; G06F 3/013; G06F 3/017; G06F 3/167; G06F 3/005; G06F 3/011; G06F 3/16; G06F 3/0346; G06F 3/04815; G06F 2203/011
  See application file for complete search history.

(56) References Cited

U.S. PATENT DOCUMENTS

| | | | |
|---|---|---|---|
| 2002/0049515 | A1 | 4/2002 | Osawa |
| 2004/0001137 | A1 | 1/2004 | Cutler et al. |
| 2004/0104702 | A1 | 6/2004 | Nakadai et al. |
| 2004/0190753 | A1 | 9/2004 | Sakagami et al. |
| 2005/0216121 | A1 | 9/2005 | Sawada et al. |
| 2006/0075422 | A1* | 4/2006 | Choi ............... G01S 3/7864 725/18 |
| 2006/0143017 | A1 | 6/2006 | Sonoura et al. |
| 2009/0271031 | A1 | 10/2009 | Kwon et al. |
| 2010/0157080 | A1 | 6/2010 | Kondo |
| 2012/0316680 | A1 | 12/2012 | Olivier, III et al. |
| 2013/0124209 | A1 | 5/2013 | Yamada |
| 2015/0073772 | A1 | 3/2015 | Jun et al. |
| 2016/0103202 | A1 | 4/2016 | Sumiyoshi et al. |

FOREIGN PATENT DOCUMENTS

| | | | |
|---|---|---|---|
| CN | 105425970 A | | 3/2016 |
| GB | 2545312 A | | 6/2017 |
| JP | 2002175091 A | | 6/2002 |
| JP | 2003-266353 A | | 9/2003 |
| JP | 2004-32782 A | | 1/2004 |
| JP | 2004-298988 A | | 10/2004 |
| JP | 2004283927 A | | 10/2004 |
| JP | 2005193331 A | | 7/2005 |
| JP | 2005313308 A | | 11/2005 |
| JP | 2005-354223 A | | 12/2005 |
| JP | 2006-123161 A | | 5/2006 |
| JP | 2006-181651 A | | 7/2006 |
| JP | 2006-212717 A | | 8/2006 |
| JP | 2007-221300 A | | 8/2007 |
| JP | 2008-145574 A | | 6/2008 |
| JP | 2008-158868 A | | 7/2008 |
| JP | 2008158868 A | * | 7/2008 |
| JP | 2008216735 A | | 9/2008 |
| JP | 200927567 A | | 2/2009 |
| JP | 2009-151314 A | | 7/2009 |
| JP | 2009241166 A | | 10/2009 |
| JP | 2009266200 A | | 11/2009 |
| JP | 2011681 A | | 1/2011 |
| JP | 2011000681 A | * | 1/2011 |
| JP | 201276162 A | | 4/2012 |
| JP | 201361715 A | | 4/2013 |
| JP | 2013104938 A | | 5/2013 |
| JP | 2013193149 A | | 9/2013 |
| JP | 2014-516816 A | | 7/2014 |
| KR | 1020160101485 A | | 8/2016 |
| WO | 200067959 A1 | | 11/2000 |
| WO | 2009078454 A1 | | 6/2009 |
| WO | 2014/167700 A1 | | 10/2014 |

OTHER PUBLICATIONS

International Search Report in PCT/JP2017/030063 dated Nov. 7, 2017. 4pp.
Office Action in JP Application No. 2018-537177, dated Oct. 23, 2018. 12pp.
Office Action in JP Application No. 2019-0375156, dated Jul. 8, 2021, 12pp.
Office Action in DE Application No. 112017004363.8, dated Apr. 14, 2021, 13pp.
Written Opinion of the ISA in PCT/JP2017/030063, dated Nov. 7, 2017, 18pp.
Office Action in GB Application No. 1902507.1, dated Dec. 20, 2021, 2pp.
Office Action in GB Application No. 1902507.1, dated Sep. 14, 2021, 7pp .
Office Action in JP Application No. 2019-037156, dated Feb. 24, 2022, 10pp.

* cited by examiner

AUTONOMOUSLY ACTING ROBOT THAT RECOGNIZES DIRECTION OF SOUND SOURCE

RELATED APPLICATIONS

The present application is a continuation of International Application No. PCT/JP2017/030063, filed Aug. 23, 2017, which claims priority from Japanese Application No. 2016-166976, filed Aug. 29, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

A sense of hearing is one of the basic senses of a living being. The sense of hearing is such that not only is a kind of sound recognized by categorizing into three elements of sound, those being magnitude (sound pressure), tone (frequency), and pitch (waveform), but also identifying a direction of a sound source is important.

A microphone array is a device that can identify the direction of a sound source by a multiple of microphones being mounted. When a voice is emitted from a certain sound source, each of the multiple of microphones collects sound. As installation positions of the microphones differ, a slight variation occurs in timings at which the sound arrives at each microphone. The direction of the sound source is identified from a state of the timing variation. There are expectations for the microphone array as an "ear" of a robot.

CITATION LIST

Patent Literature

PTL 1: JP-A-2004-32782

SUMMARY OF INVENTION

Technical Problem

However, it is difficult for a microphone array to distinguish between sound that arrives directly from a sound source and sound that arrives by reflecting off a wall or the like. When a person speaks to a robot, one portion of a voice may reach the robot by reflecting off a wall, because of which there is a possibility of the robot being under a misapprehension that sound sources exist in a multiple of directions.

The invention, having been completed based on a recognition of the heretofore described problem, has a main object of providing technology such that a robot more accurately identifies a direction of a sound source.

Solution to Problem

An autonomously acting robot in an aspect of the invention includes an operation control unit that selects a motion of the robot, a drive mechanism that executes a motion selected by the operation control unit, a microphone array that detects a sound source direction, and a recognizing unit that, when a sound emitting body having predetermined characteristics is detected in an image of a sound source direction detected by the microphone array, identifies the sound emitting body as a sound source.

The recognizing unit searches for a sound emitting body from an image in which each sound source direction is filmed when a multiple of sound source directions are detected by the microphone array.

An autonomously acting robot in another aspect of the invention includes an operation control unit that selects a motion of the robot, a drive mechanism that executes a motion selected by the operation control unit, a microphone array that detects a direction of a sound source, a temperature sensor that detects a temperature distribution of a space, and a recognizing unit that, when a heat generating body is detected in a sound source direction detected by the microphone array, identifies the heat generating body as a sound source.

The recognizing unit searches for a heat generating body based on a temperature distribution in each sound source direction when a multiple of sound source directions are detected by the microphone array.

An autonomously acting robot in another aspect of the invention includes an operation control unit that selects a motion of the robot, a drive mechanism that executes a motion selected by the operation control unit, a microphone that detects a sound in a periphery, and a recognizing unit that tracks an object having predetermined characteristics by continuously filming the periphery.

The recognizing unit identifies an object correlated to characteristics of a sound detected by the microphone, and the operation control unit selects a motion of directing a head portion of the robot in a direction of the object.

A behavior control program in an aspect of the invention causes a computer to execute a function of detecting a sound source direction using a microphone array, a function of filming in a detected sound source direction, thereby acquiring an image, and a function of, when a sound emitting body having predetermined characteristics is detected in the image, identifying the sound emitting body as a sound source.

A behavior control program in another aspect of the invention causes a computer to execute a function of detecting a sound source direction using a microphone array, a function of, when a heat generating body is detected in a sound source direction identified by the microphone array, identifying the heat generating body as a sound source, and a function of causing a head portion of a robot to face in a direction of an identified sound source.

A behavior control program in another aspect of the invention causes a computer to execute a function of tracking an object having predetermined characteristics by continuously filming a periphery, a function of detecting a sound, and a function of identifying, from among one or more objects that are tracking targets, an object correlated to characteristics of a detected sound as a sound source.

Advantageous Effects of Invention

According to the invention, a robot can easily identify a sound source direction accurately.

DESCRIPTION OF EMBODIMENTS

Figure 1A:
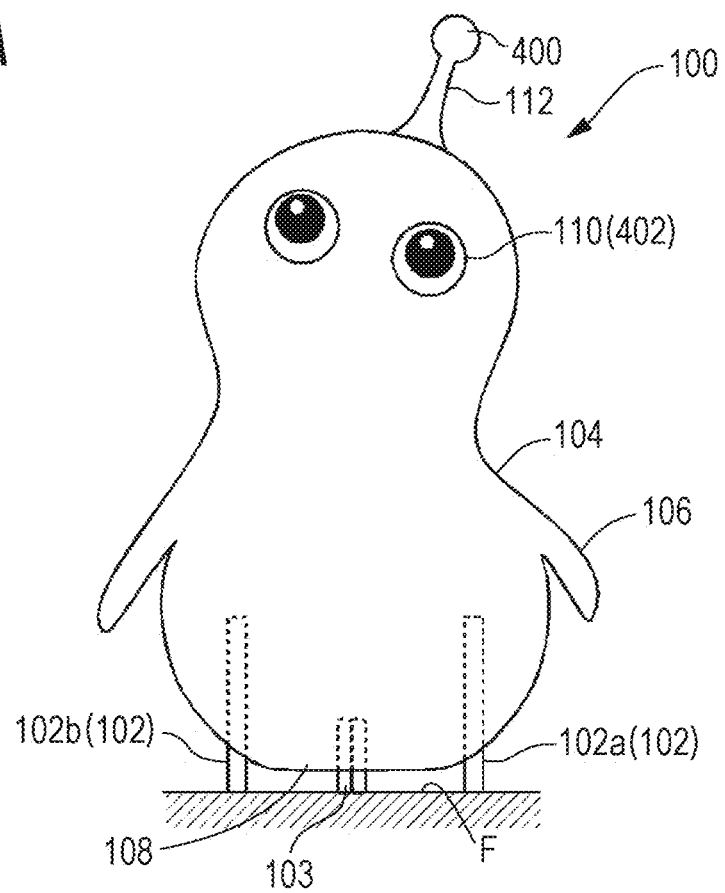
FIG. 1A is a front external view of a robot.
Figure 1B:
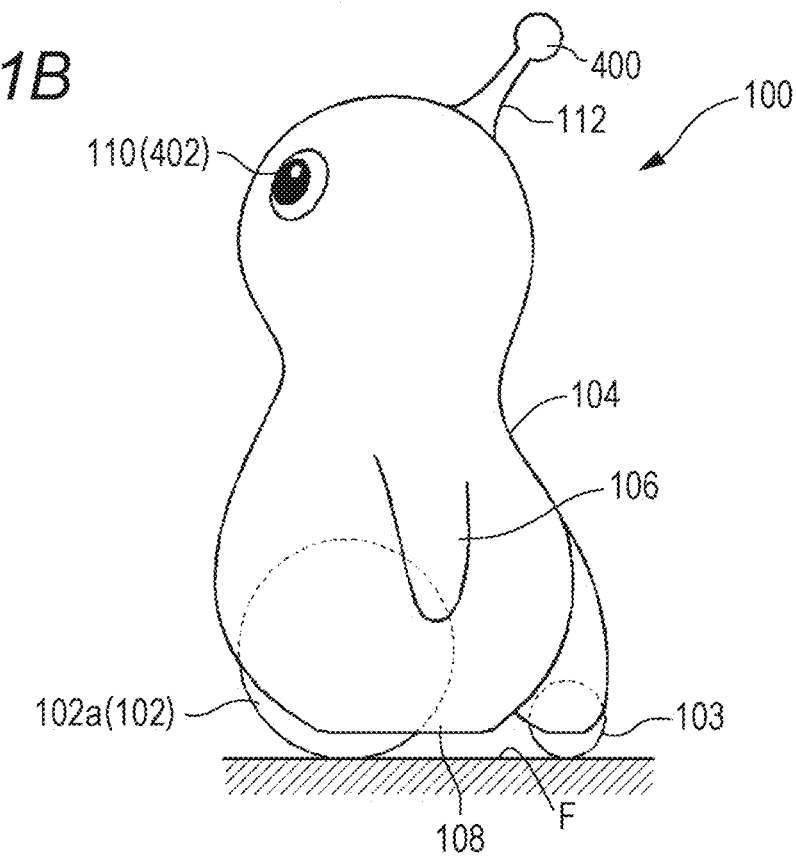
FIG. 1B is a side external view of the robot.

FIG. 1A is a front external view of a robot 100. FIG. 1B is a side external view of the robot 100.

The robot 100 in this embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely stored in the body 104 using a drive mechanism (a pivoting mechanism and a linking mechanism). A greater portion of each wheel is hidden by the body 104 when traveling too, but when each wheel is completely stored in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

A high resolution camera 402 is incorporated in an eye 110. The eye 110 is also capable of an image display using a liquid crystal element or an organic EL element. The robot 100 incorporates a speaker, and is also capable of simple vocalization.

A horn 112 is attached to a head portion of the robot 100. As the robot 100 is lightweight, as heretofore described, a user can also lift up the robot 100 by grasping the horn 112.

An omnidirectional camera 400 (a first camera) is incorporated in the horn 112 of the robot 100 of the embodiment. The omnidirectional camera 400 can film in all directions up and down and left and right (360 degrees: in particular, practically all regions above the robot 100) at one time using a fisheye lens (refer to FIG. 8). The high resolution camera 402 (a second camera) incorporated in the eye 110 can film only in a direction in front of the robot 100. A filming range of the omnidirectional camera 400 is wide, but resolution is lower than that of the high resolution camera 402.

In addition to this, the robot 100 incorporates various sensors, such as a temperature sensor (thermosensor) that converts a peripheral temperature distribution into an image, a microphone array having a multiple of microphones, a form measuring sensor (depth sensor) that can measure a form of a measurement target, and an ultrasonic wave sensor.

Figure 2:
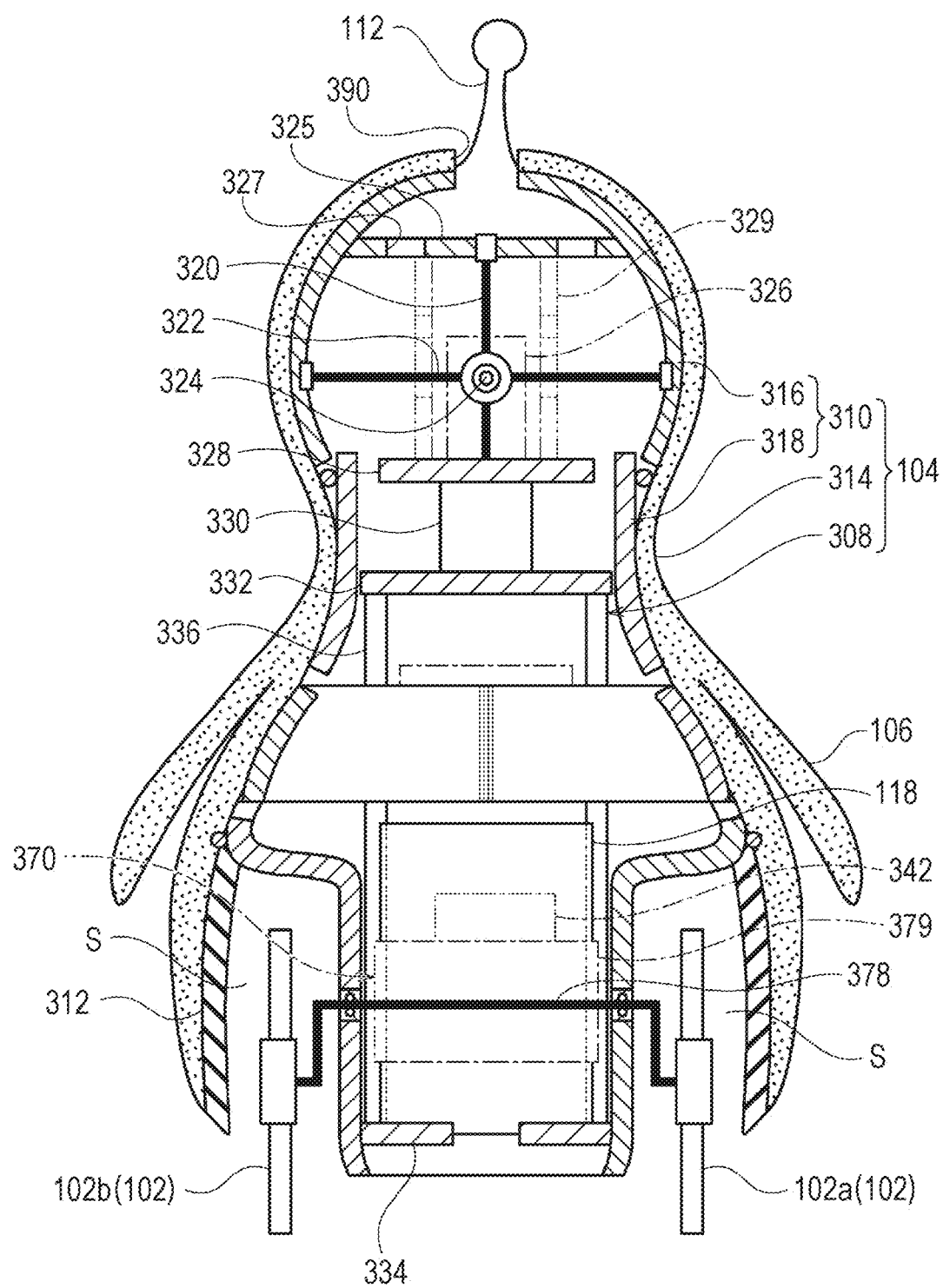
FIG. 2 is a sectional view schematically representing a structure of the robot.

FIG. 2 is a sectional view schematically representing a structure of the robot 100.

As shown in FIG. 2, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control device 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantograph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 318 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 3:
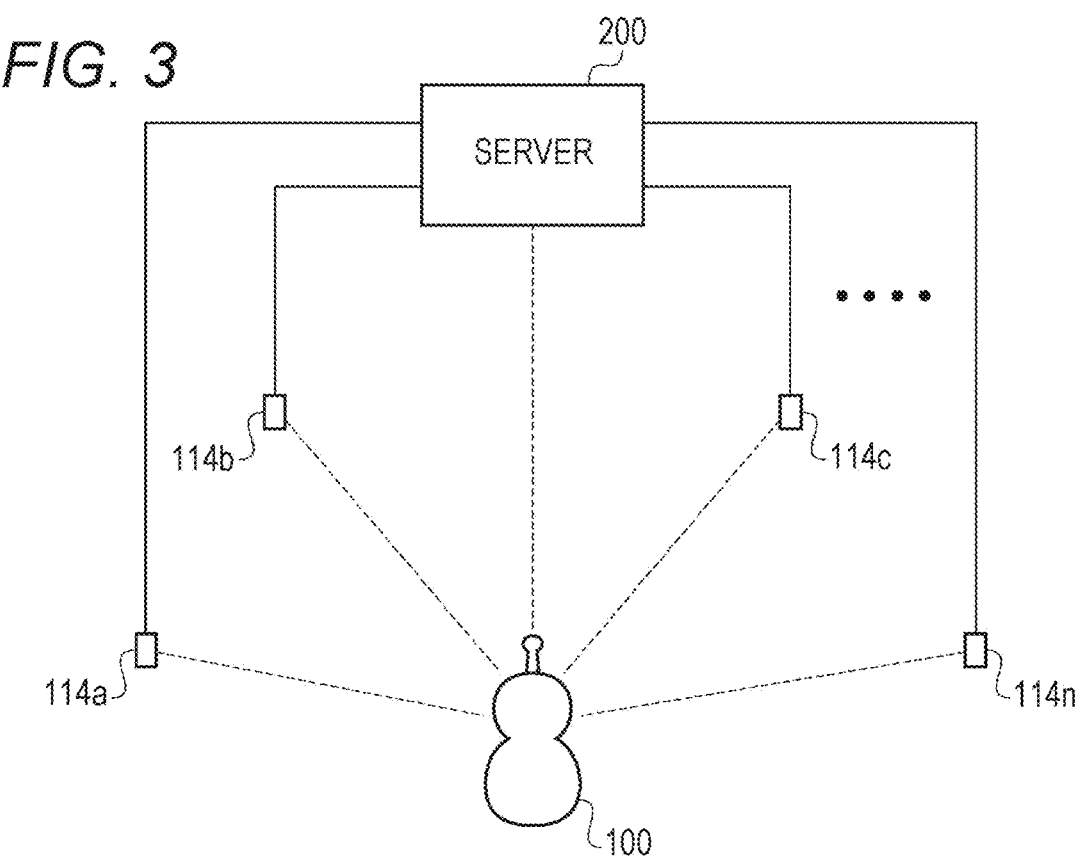
FIG. 3 is a configuration diagram of a robot system.

FIG. 3 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment correspond one-to-one. The server 200 determines a basic action of the robot 100 based on information obtained from the sensors incorporated in the robot 100 and the multiple of external sensors 114.

The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits its own positional coordinates to the server 200 may also be adopted.

Figure 4:
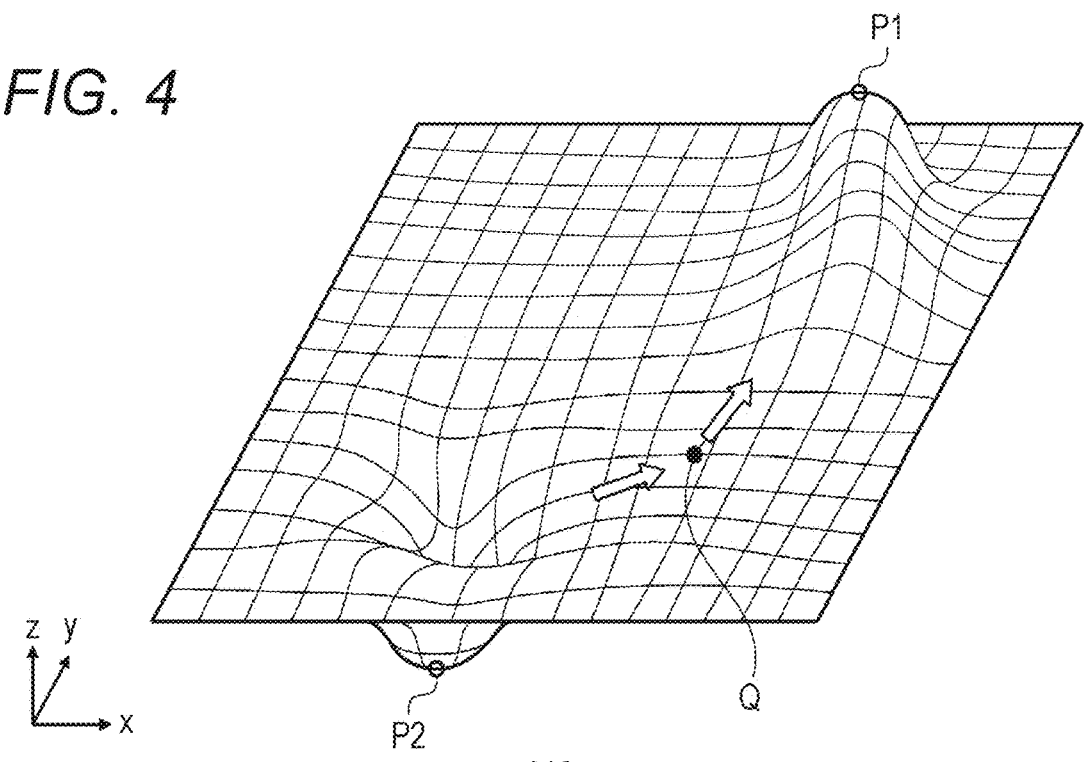
FIG. 4 is a schematic view of an emotion map.

FIG. 4 is a schematic view of an emotion map 116.

The emotion map 116 is a data table stored in the server 200. The robot 100 selects an action in accordance with the emotion map 116. The emotion map 116 shown in FIG. 4 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 4, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the front wheel 102 or the rear wheel 103, thereby identifying the current position, or may identify the current position based on an image obtained from the camera.

When the emotion map 116 shown in FIG. 4 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 4. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 5:
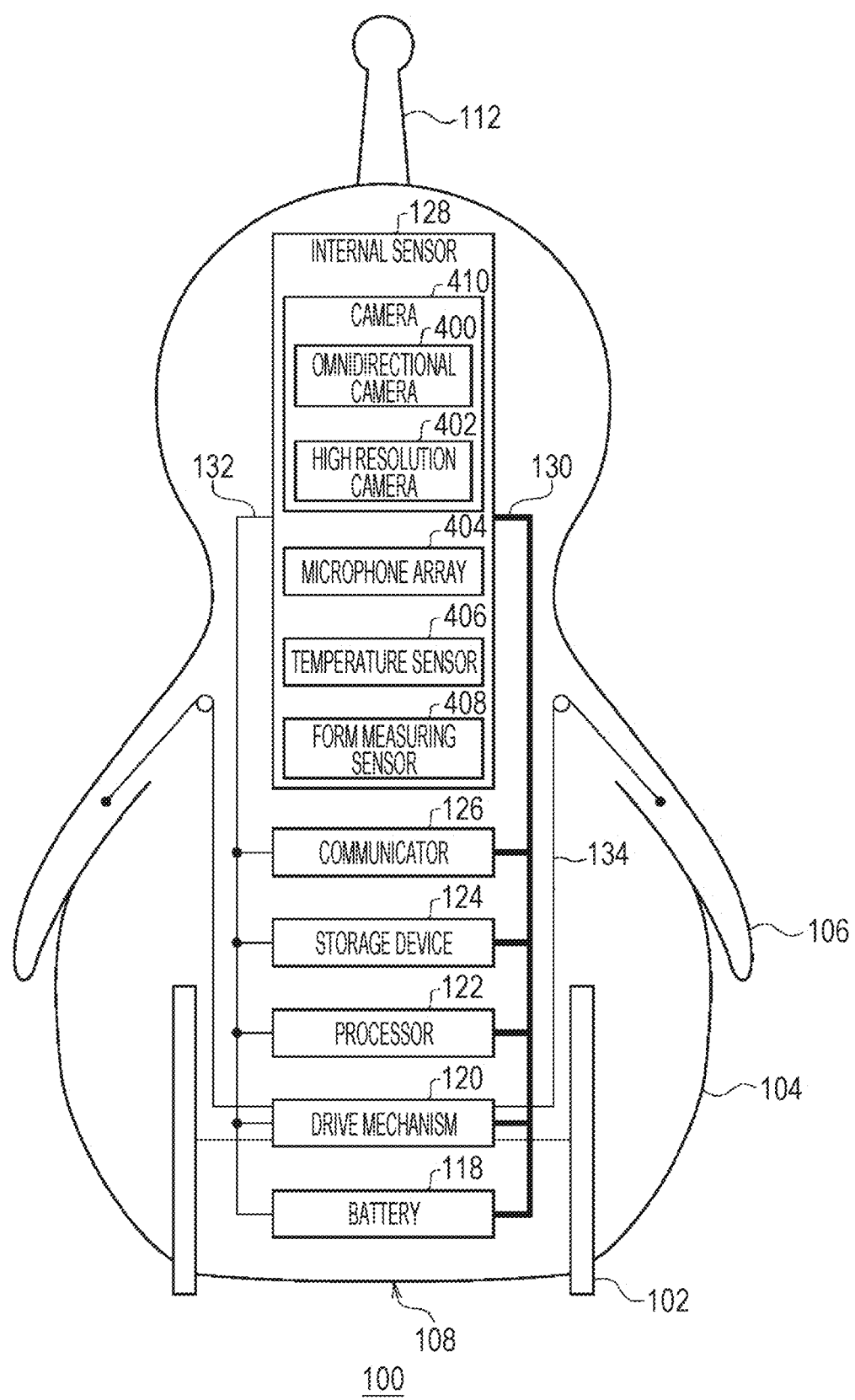
FIG. 5 is a hardware configuration diagram of the robot.

FIG. 5 is a hardware configuration diagram of the robot 100.

The robot 100 includes an internal sensor 128, a communicator 126, a storage device 124, a processor 122, a drive mechanism 120, and a battery 118. The drive mechanism 120 includes the heretofore described wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, in addition to a camera 410 (the omnidirectional camera 400 and the high resolution camera 402), a microphone array 404, a temperature sensor 406, and a form measuring sensor 408, the internal sensor 128 is an infrared sensor, a touch sensor, an acceleration sensor, a smell sensor, and the like. The smell sensor is a commonly known sensor that applies a principle such that electrical resistance changes in accordance with adsorption of molecules that form a source of a smell. The smell sensor categorizes various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheels (front wheels 102) and the head portion (the head portion frame 316). The drive mechanism 120 changes a direction of movement and a movement speed of the robot 100 by changing the rotational speed and the direction of rotation of each of the two front wheels 102. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state.

The arm 106 can be raised by the drive mechanism 120 pulling the arm 106 via a wire 134. A gesture like an arm waving can also be performed by the arm 106 being caused to oscillate. A more complex gesture can also be represented by a large number of the wire 134 being utilized.

Figure 6:
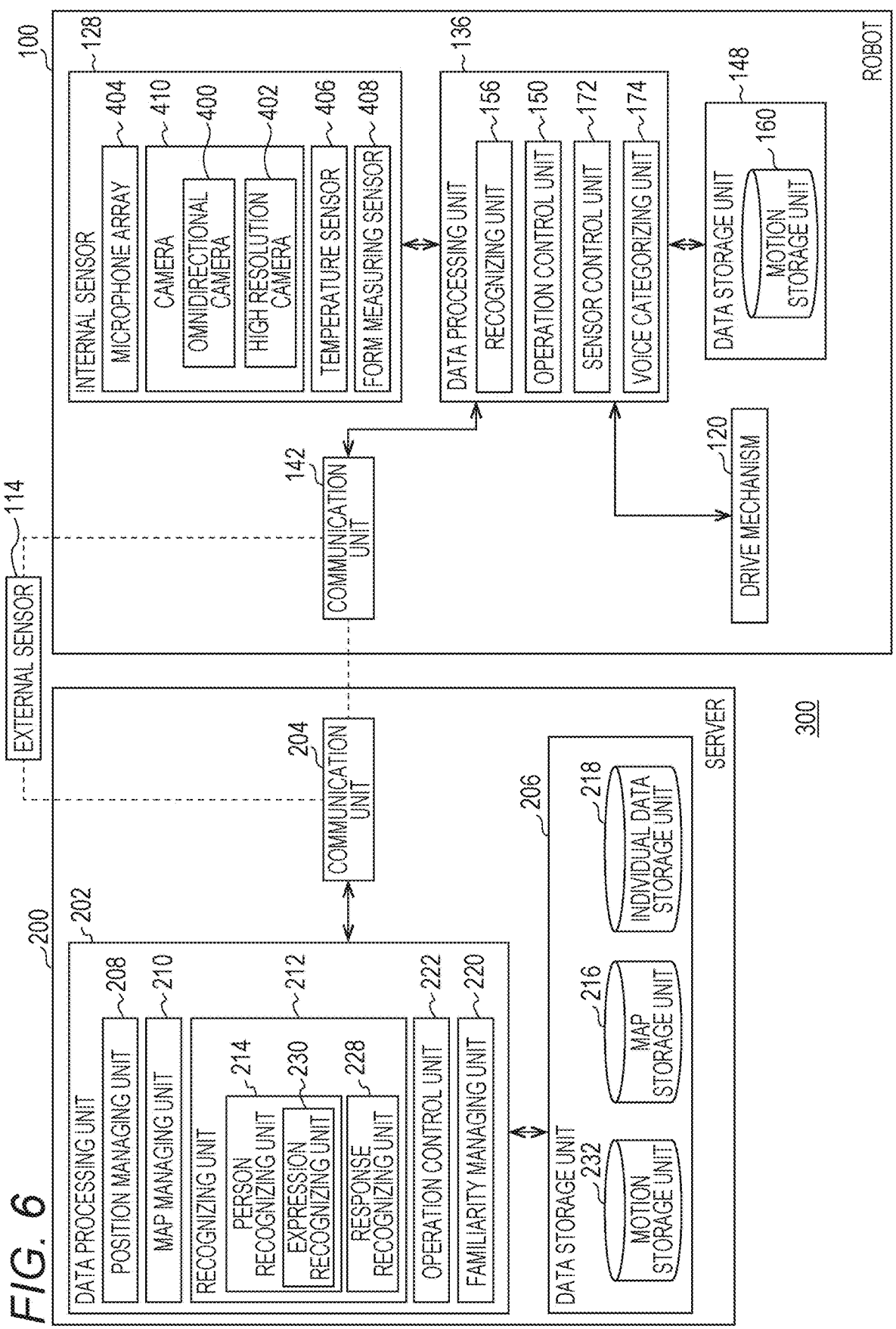
FIG. 6 is a functional block diagram of the robot system.

FIG. 6 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206.

The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218.

The robot 100 has a multiple of operation patterns (motions). Various motions, such as waving the arm, approaching an owner while meandering, and staring at an owner with the head to one side, are defined.

The motion storage unit 232 stores control details of a motion (a motion file). Each motion is identified by motion ID. The motion file is also downloaded into a motion storage unit 160 of the robot 100. Which motion is to be executed may be determined in the server 200, or may be determined in the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time for changing from a preceding unit motion to a subsequent unit motion is called an "interval". It is sufficient that an interval is defined in accordance with time needed fora unit motion change or details of a motion. A length of an interval can be regulated.

Hereafter, settings involved in controlling an action of the robot 100, such as which motion is chosen and when, and output regulation of each actuator when realizing a motion, will collectively be called "behavioral characteristics". The behavioral characteristics of the robot 100 are defined by a motion selection algorithm, a motion selection probability, a motion file, and the like.

The map storage unit 216 stores a multiple of action maps. The individual data storage unit 218 stores information on a user, and in particular, on an owner. Specifically, the individual data storage unit 218 stores various kinds of parameter, such as familiarity with respect to a user, and physical characteristics and behavioral characteristics of a user. The individual data storage unit 218 may also store other attribute information such as age and gender.

The robot 100 identifies a user based on the user's physical characteristics or behavioral characteristics. The robot 100 constantly films a periphery using the incorporated camera. Further, the robot 100 extracts the physical characteristics and behavioral characteristics of a person appearing in an image. The physical characteristics may be visual characteristics inherent to a body, such as a height, clothes worn by choice, a presence or absence of spectacles, a skin color, a hair color, or an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information or other sensing information.

Although the method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In this embodiment, users are clustered based on physical characteristics and behavioral characteristics, and a user is identified using deep learning (a multilayer neural network). Details will be described hereafter.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, and a familiarity managing unit 220.

The position managing unit 208 identifies the positional coordinates of the robot 100 using the method described using FIG. 3. The position managing unit 208 may also track positional coordinates of a user in real time.

The map managing unit 210 changes the parameter of each coordinate on the multiple of action maps using the method described in connection with FIG. 4. The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 infers an emotion of a user using image recognition of an expression of the user.

The person recognizing unit 214 also extracts characteristics of a moving object other than a person, for example, a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation control unit 222 of the server 200 determines a motion of the robot 100 in cooperation with an operation control unit 150 of the robot 100. The operation control unit 222 of the server 200 compiles a movement target point of the robot 100, and a movement route for the movement target point, based on an action map selection by the map managing unit 210. The movement control unit 222 compiles a multiple of movement routes, and having done so, may select any of the movement routes.

The operation control unit 222 selects a motion of the robot 100 from a multiple of motions of the motion storage unit 232. A selection probability is correlated for each situation to each motion. For example, a selection method such that a motion A is executed at a probability of 20% when a pleasant action is performed by an owner, and a motion B is executed at a probability of 5% when an air temperature is 30 degrees or higher, is defined.

A movement target point and a movement route are determined by an action map, and a motion is selected in accordance with various kinds of event to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that owner. When an unpleasant action is detected, the familiarity managing unit 220 reduces familiarity. Also, familiarity of an owner not visually recognized for a long period gradually decreases.

Robot 100

The robot 100 includes the internal sensor 128, a communication unit 142, a data processing unit 136, a data storage unit 148, and the drive mechanism 120.

The internal sensor 128 is a collection of various kinds of sensor. The internal sensor 128 includes the microphone array 404, the camera 410, the temperature sensor 406, and the form measuring sensor 408. The microphone array 404, being a unit wherein a multiple of microphones are linked together, is a voice sensor that detects sound. The camera 410 is a device that films the exterior. It is sufficient that the microphone array 404 is a device that detects sound, and can detect a direction of a source of the sound. The camera 410 includes the omnidirectional camera 400 and the high resolution camera 402. The temperature sensor 406 detects a temperature distribution of an external environment, and converts the temperature distribution into an image. The form measuring sensor 408 is an infrared depth sensor that reads a depth, and by extension an uneven form, of a target object by emitting near-infrared rays from a projector, and detecting reflected light of the near-infrared rays using a near-infrared camera.

The communication unit 142 corresponds to the communicator 126 (refer to FIG. 5), and manages a process of communicating with the external sensor 114 and the server 200. The data storage unit 148 stores various kinds of data. The data storage unit 148 corresponds to the storage device 124 (refer to FIG. 5). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100.

Various kinds of motion file are downloaded into the motion storage unit 160 of the robot 100 from the motion storage unit 232 of the server 200. A motion is identified by motion ID. An operating timing, an operating time, an operating direction, and the like, of the various kinds of actuator (the drive mechanism 120) are defined chronologically in a motion file in order to perform various motions such as sitting by housing the front wheel 102, raising the arm 106, causing the robot 100 to carry out a rotating action by causing the two front wheels 102 to rotate in reverse or by causing only one front wheel 102 to rotate, shaking by causing the front wheel 102 to rotate in a state in which the front wheel 102 is housed, or stopping once and looking back when moving away from a user.

The data processing unit 136 includes a recognizing unit 156, the operation control unit 150, a sensor control unit 172, and a voice categorizing unit 174.

The operation control unit 150 of the robot 100 determines a motion of the robot 100 in cooperation with the operation control unit 222 of the server 200. One portion of motions may be determined by the server 200, and other motions may be determined by the robot 100. Also, a configuration may be such that the robot 100 determines a motion, but the server 200 determines a motion when a processing load of the robot 100 is high. A motion that forms a base may be determined by the server 200, and an additional motion may be determined by the robot 100. It is sufficient that a way in which a motion determining process is shared between the server 200 and the robot 100 is designed in accordance with specifications of the robot system 300.

The operation control unit 150 of the robot 100 determines a direction of movement of the robot 100 together with the operation control unit 222 of the server 200. Movement based on an action map may be determined by the server 200, and an immediate movement such as avoiding an obstacle may be determined by the operation control unit 150 of the robot 100. The drive mechanism 120 causes the robot 100 to head toward a movement target point by driving the front wheel 102 in accordance with an instruction from the operation control unit 150.

The operation control unit 150 of the robot 100 instructs the drive mechanism 120 to execute a selected motion. The drive mechanism 120 controls each actuator in accordance with the motion file.

The operation control unit 150 can also execute a motion of holding up both arms 106 as a gesture asking for "a hug" when a user with a high degree of familiarity is nearby, and can also perform a motion of no longer wanting to be hugged by repeatedly causing the left and right front wheels 102 to alternately rotate in reverse and stop in a housed state when bored of the "hug". The drive mechanism 120 causes the robot 100 to perform various motions by driving the front wheel 102, the arm 106, and the neck (head portion frame 316) in accordance with an instruction from the operation control unit 150.

The sensor control unit 172 controls the internal sensor 128. Specifically, the sensor control unit 172 controls a direction of measurement by the high resolution camera 402, the temperature sensor 406, and the form measuring sensor 408. The direction of measurement by the high resolution camera 402, the temperature sensor 406, and the form measuring sensor 408 mounted in the head portion of the robot 100 changes in accordance with the orientation of the head portion frame 316, but the sensor control unit 172 can also control a direction of the high resolution camera 402 and the like individually.

The voice categorizing unit 174, specifically, categorizes detected voices into a multiple of categories based on, in addition to a magnitude, a tone, and a pitch of a voice, voice characteristics such as a speech pattern. Rather than the voice categorizing unit 174, the recognizing unit 156 may execute voice categorization.

The recognizing unit 156 of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films a periphery using the camera 410 and the form measuring sensor 408, and detects a moving object such as a person or a pet. Characteristics thereof are transmitted to the server 200, and the person recognizing unit 214 of the server 200 extracts the physical characteristics of the moving object. Also, the recognizing unit 156 also detects a smell of a user and a voice of a user. Smell and sound (voice) are classified into multiple kinds using a commonly known method.

When a strong force is applied to the robot 100, the recognizing unit 156 recognizes this using an incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the front wheels 102 decreasing.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 of the server 200 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

When a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created.

Although the above is a simple example, the first profile corresponding to a father and the second profile corresponding to a mother are formed using the heretofore described method, and the robot 100 recognizes that there at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing".

It is assumed that the robot 100 newly recognizes a moving object (user) in a state in which this kind of cluster analysis is completed.

At this time, the person recognizing unit 214 of the server 200 extracts characteristics from sensing information of an image or the like obtained from the robot 100, and determines which cluster a moving object near the robot 100 corresponds to using deep learning (a multilayer neural network). For example, when a moving object that has a beard is detected, the probability of the moving object being the father is high. When the moving object is active early in the morning, it is still more certain that the moving object corresponds to the father. Meanwhile, when a moving object that wears spectacles is detected, there is a possibility of the moving object being the mother. When the moving object has a beard, the moving object is neither the mother nor the father, because of which the person recognizing unit 214 determines that the moving object is a new person who has not been cluster analyzed.

Formation of a cluster by characteristic extraction (cluster analysis) and application to a cluster accompanying characteristic extraction (deep learning) may be executed concurrently.

Familiarity toward a moving object (user) changes in accordance with how the robot 100 is treated by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A cluster with extremely high familiarity

The robot 100 strongly expresses a feeling of affection by approaching a user (hereafter called "an approaching action"), and by performing an affectionate gesture defined in advance as a gesture indicating goodwill toward a person.

(2) A cluster with comparatively high familiarity

The robot 100 carries out only an approaching action.

(3) A cluster with comparatively low familiarity

The robot 100 does not carry out any special action.

(4) A cluster with particularly low familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

Figure 7:
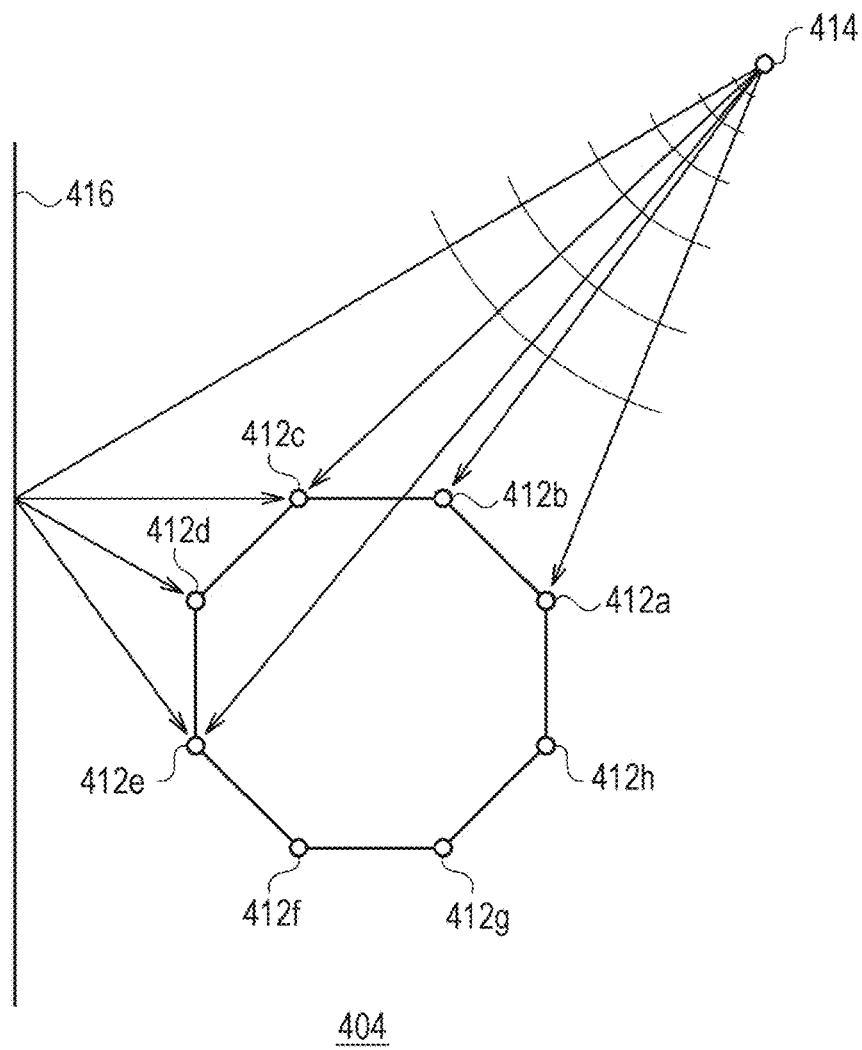
FIG. 7 is a schematic view showing a measuring principle of a microphone array.

FIG. 7 is a schematic view showing a measuring principle of the microphone array 404.

The microphone array 404 is installed in the head portion of the robot 100. The microphone array 404 includes a multiple of microphones 412 (microphones 412a to 412h). The microphone array 404 is incorporated in the head portion frame 316 of the robot 100 so that a face formed by the multiple of microphones 412 is parallel to the floor surface.

A sound emitted from a certain sound source 414 is collected by the multiple of microphones 412. As distances between the sound source 414 and each microphone 412 do not coincide, variation occurs in sound collection timing. A position of the sound source 414 is detected from a magnitude and a phase of sound at each microphone 412. For example, as the microphone 412c is farther than the microphone 412b from the sound source 414, the timing of sound collection at the microphone 412c is later than at the microphone 412b. A sound source can also be visualized (distribution of sound in space) using the microphone array 404.

When spoken to, a living being such as a person performs some kind of responsive action, such as directing the face in the direction of the voice. In order to realize the same kind of action in the robot 100 too, the robot 100 in the embodiment detects a position of the sound source 414, in particular a direction of the sound source 414, using the microphone array 404.

Although the sound source 414 may be a living being such as a person or a pet, the sound source 414 may also be an inanimate object such as audio equipment or a television. Also, there is also a case in which a sound emitted from the sound source 414 is reflected from a wall 416, and the reflected sound is collected by the microphone array 404. The microphone 412c shown in FIG. 7 collects both sound arriving directly from the sound source 414 and sound reflected from the wall 416. Because of this, there is a case in which even though there is only one sound source 414, the microphone array 404 detects assuming that a multiple of the sound source 414 (the true sound source 414 and the wall 416) exist.

Because of this, when directing the head portion of the robot 100 in a sound source direction identified based on voice information from the microphone array 404, there is a possibility of the robot 100 facing the wall 416 rather than the sound source 414. The same applies when a voice is emitted from a television or audio equipment.

Figure 8:
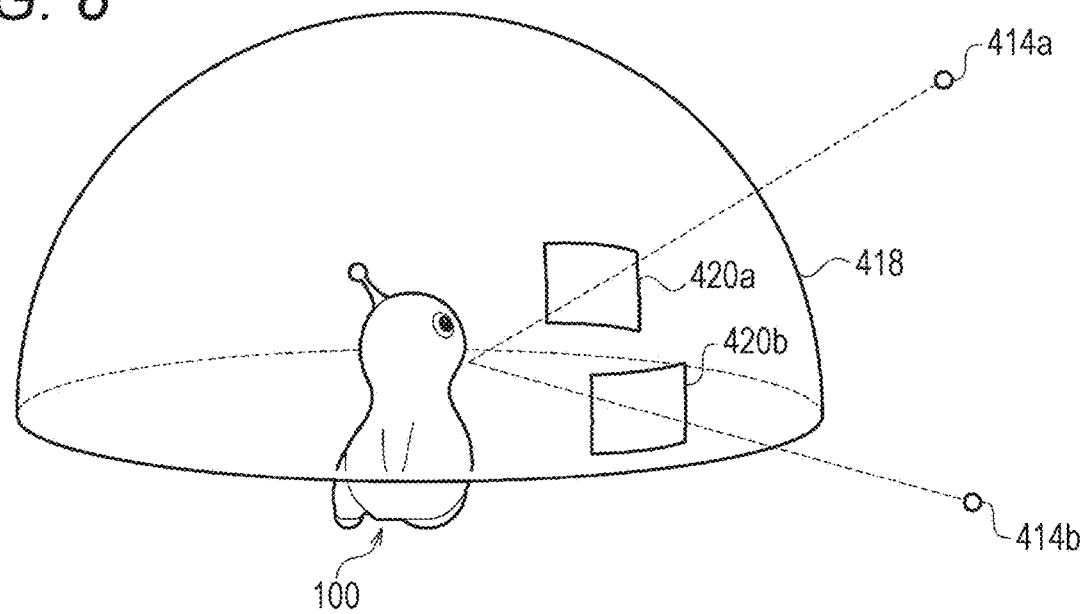
FIG. 8 is a schematic view showing a sound source identification method in an embodiment.

FIG. 8 is a schematic view showing a sound source identification method in the embodiment.

The robot 100 in the embodiment confirms the sound source 414 using the camera 410 in addition to the microphone array 404. FIG. 8 shows a situation in which two sound sources 414 (a sound source 414a and a sound source 414b) are detected by the microphone array 404. An omnidirectional filming range 418 is a filming range of the omnidirectional camera 400. The omnidirectional camera 400 can film approximately the whole region of the hemisphere above the robot 100 at one time. The recognizing unit 156 of the robot 100 analyzes an image of a filming region 420a, which is a predetermined range of the omnidirectional filming range 418 that includes a direction of the sound source 414a.

The recognizing unit 156 carries out image analysis to determine whether a sound emitting body having predetermined characteristics exists in the filming region 420a. A "sound emitting body" here means an object that emits a sound, that is, an "object that can form a sound source". In addition to a living being such as a person or an animal, a television, audio equipment, a telephone, and the like are also sound emitting bodies. Of the sound emitting bodies, a living being that can emit a voice, like a person (user) or an animal (pet), is called a "voice emitting body" in the embodiment. A configuration may be such that only a person is a detection target.

Hereafter, a description will be given with detection of a voice emitting body as a subject.

Also, a description will be given assuming that a process of recognizing a voice emitting body from an image of the filming region 420 is executed in the recognizing unit 156 of the robot 100. Image recognition may be executed in the recognizing unit 212 of the server 200, or may be executed by both the recognizing unit 212 of the server 200 and the recognizing unit 156 of the robot 100.

An object having physical and behavioral characteristics peculiar to a living being, such as having portions corresponding to two eyes and one mouth, being flesh color, moving, and wearing clothing, is recognized as a voice emitting body. When a voice emitting body is detected in the filming region 420a, the voice emitting body is identified as being a voice emission source (sound source). A "voice emission source" means a source of vocalization by a voice emitting body, or in other words, a voice emitting body that actually emits a voice. When no voice emitting body is detected in the filming region 420a, image analysis is carried out on the filming region 420a corresponding to the second sound source 414b.

According to this kind of control method, audio equipment, which is the sound source 414 that does not include characteristics of a voice emitting body, can be eliminated from voice emission source candidates. With regard to sound reflected from the wall 416 too, no object including characteristics as a voice emitting body is detected in the direction of the wall 416, because of which the wall 416 is also eliminated from voice emission source candidates. Even when an image including characteristics of a voice emitting body is displayed on a television, it can be determined that this is not a voice emission source when an outer frame of the television is detected in an image.

When detecting a sound, the robot 100 directs the head portion toward both or one of the sound source 414a and the sound source 414b. Specifically, the operation control unit 150 causes the head portion frame 316 to rotate so as to face the sound source 414 from which sound pressure (volume) of a predetermined value or greater is detected. When sound pressure of the predetermined value or greater is detected from both the sound source 414a and the sound source 414b, the head portion frame 316 may be directed toward the sound source that emits the greater sound pressure, or the head portion frame 316 may be caused to rotate sequentially so as to face each of the two sound sources 414.

When a voice emitting body is detected in the filming region 420a, the operation control unit 150 drives the front wheel 102, thereby directing the trunk portion frame 318, that is, the body 104 of the robot 100, toward the sound source 414a. When a voice emitting body is detected in the filming region 420b, the robot 100 directs the body toward the sound source 414b.

According to this kind of control method, behavioral characteristics of directing the head in response to a sound, and redirecting the whole body when a voice emitting body (a person or the like) is confirmed in the direction of the sound, are realized.

The filming region 420 may be cut out as one portion of the omnidirectional filming range 418 of the omnidirectional camera 400. Alternatively, the filming region 420 may be filmed anew by the high resolution camera 402 after the head portion is directed toward the sound source 414. When the high resolution camera 402 can be independently controlled, the sensor control unit 172 may film the filming region 420 by directing the high resolution camera 402 toward the sound source 414. When filming the sound source 414 using the high resolution camera 402 having a higher resolution than the omnidirectional camera 400, a voice emitting body is more reliably easily detected from the filming region 420.

When a voice emitting body is detected in the image, the recognizing unit 156 may further detect whether or not there is movement of lips of the voice emitting body, and in particular, whether or not there is movement accompanying speech. More specifically, a voice emitting body that moves the lips in a vocalization detection period is recognized as the voice emission source of the vocalization. By checking the lips, the robot 100 can more reliably identify who is speaking to it (the robot 100).

Furthermore, the recognizing unit 156 measures the peripheral temperature distribution of the sound source 414 using the temperature sensor 406, and determines whether or not the sound source 414 is a heat generating body, particularly a heat generating body in the region of 30 to 40 degrees Celsius. As a warm-blooded animal such as a person or a pet is a heat generating body, audio equipment, a television, a wall, a mirror, and the like can be eliminated from voice emission source candidates by the temperature measurement.

Furthermore, the recognizing unit 156 measures a three-dimensional form of the sound source 414 using the form measuring sensor 408, and determines whether or not the sound source 414 is an object having a predetermined form. For example, the recognizing unit 156 determines whether or not the sound source 414 has an uneven form. When the sound source 414 does not have an uneven form, it is thought that the sound source 414 is a flat body such as a television, a wall, or a mirror, because of which these can be eliminated from the voice emission source. More preferably, it is desirable that characteristics of the three-dimensional form of the voice emitting body are detected by the form measuring sensor 408. When characteristics of the form of a person's face or an animal's face (the position of the nose, the form of the mouth, and the like) can be recognized, an inanimate object such as audio equipment or a television is more reliably easy to eliminate from the voice emission source candidates. Characteristic information of faces of each cluster is also stored in the individual data storage unit 218 by the form measuring sensor 408. This means that, more preferably, who the voice emitting body is may be identified by the form measuring sensor 408.

Figure 9:
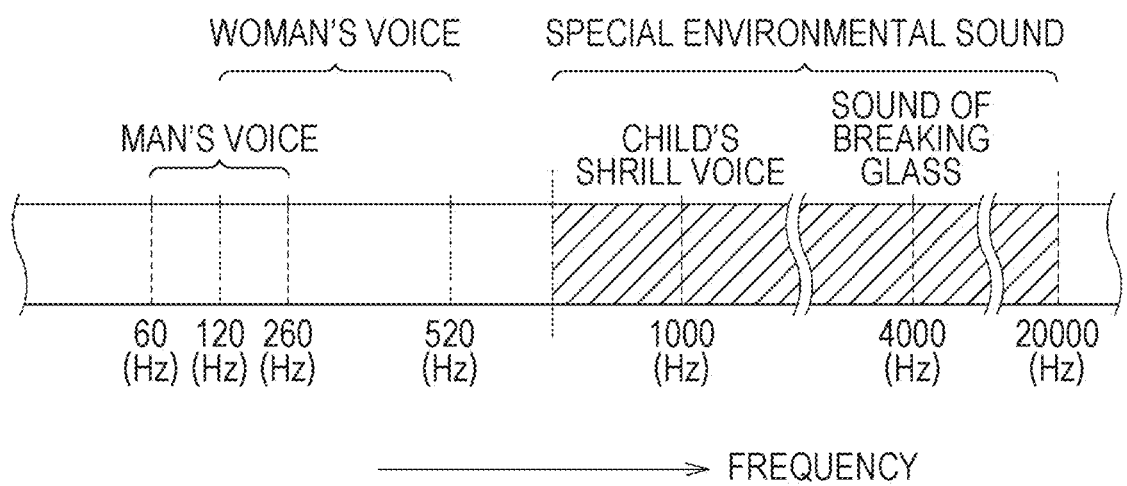
FIG. 9 is a schematic view showing a relationship between a frequency band and a sound type.

FIG. 9 is a schematic view showing a relationship between a frequency band and a sound type.

Generally, it is said that the frequency band of a voice of an adult male is in the region of 60 to 260 Hz, and the frequency band of a voice of an adult female is in the region of 120 to 520 Hz. Consequently, even when a frequency band in the region of 50 to 600 Hz is filtered, an adult voice can be recognized.

A shrill voice of a child is said to be in the region of 1,000 Hz, and the sound of breaking glass is said to be in the region of 4,000 Hz. Also, although depending on age, a frequency audible to a person is said to be approximately 20 Hz to 20,000 Hz. A frequency exceeding 20,000 Hz is called "ultrasonic", and is normally a sound that cannot be detected with a human sense of hearing.

For the robot 100 to respond to a person's voice, it is sufficient to be able to recognize in the region of 50 to 600 Hz (hereafter, this frequency band is called a "speech frequency band"). A configuration may be such that the recognizing unit 156 (or the voice categorizing unit 174), using frequency filtering, extracts only the sound source 414 in the speech frequency band as a voice emitting body candidate. In this case, even when a large number of the sound source 414 are detected, it is sufficient that image analysis is carried out by reducing to only the sound sources 414 that form voice emitting body candidates, because of which the processing load of the robot 100 can be reduced.

In a frequency band other than the speech frequency band too, there is an environmental sound that surprises a living being, and an environmental sound that at least draws the attention of a living being. In the embodiment, this kind of environmental sound is defined as a "special environmental sound". A special environmental sound is of a high frequency, and is a loud, high-pitched sound wherein sound pressure is of a predetermined threshold or greater. In the embodiment, a special environmental sound is a high-pitched sound of 600 to 20,000 Hz, and is defined as a sound of 70 decibels or greater. Hereafter, the heretofore described characteristics of a special environmental sound are called "special environmental sound conditions".

Even when the speech frequency band is subjected to frequency filtering, the operation control unit 150 causes the robot 100 to execute a predetermined motion (reactive behavior) when the recognizing unit 156 detects a special environmental sound. A predetermined motion here is a motion expressing surprise, agitation, or interest with respect to a special environmental sound, and is desirably defined as a motion that expresses reaction to a sound. For example, a motion such as moving away from the sound source 414, shaking the body, directing only the head portion toward the sound source 414, emitting a cry, or approaching the sound source 414, is selected. Alternatively, when a special environmental sound or a vocalization by a voice emitting body is heard while some motion is being executed, paying attention may be behaviorally expressed by reducing the speed of the motion being executed, pausing, or the like.

The voice categorizing unit 174 categorizes sounds into a multiple of categories based on voice characteristics, specifically the magnitude of a sound, the frequency band, the speech pattern, and the like. Categories may be a person, a dog, or a special environmental sound, or more detailed categories of an adult male, an adult female, a child, or an explosive sound may be defined. In the case of an adult male category, the frequency band is 60 to 26 Hz, and voice characteristics typical to an adult male, such as a pattern of sound magnitude change, are defined. A multiple of categories may also be defined for a special environmental sound. It is sufficient that multiple kinds of motion are defined in accordance with kinds of special environmental sound. For example, a motion of escaping from the sound source 414 may be selected when a special environmental sound (high-pitch category) of a high-pitch portion (5,000 Hz or higher) is detected, and a motion of approaching the sound source 414 may be selected when a special environmental sound (low-pitch category) of a low-pitch portion (700 Hz or lower) is detected.

When a special environmental sound is detected, the robot 100 at least directs the head or the body toward the sound source 414 of the special environmental sound. Even in the case of a sound reflected from a wall or a sound that permeates a wall, the robot 100 expresses surprise and curiosity by looking once at the sound source 414 when a special environmental sound is detected, and subsequently executes a motion corresponding to the kind of special environmental sound.

An action map such as the emotion map 116 may be updated in accordance with the kind of special environmental sound. For example, when a particularly loud special environmental sound is detected, the sound source 414 thereof may be set as a disliked point. Also, when a special environmental sound of low sound pressure is detected, the action map may be updated so as to express a strength of curiosity with respect to the sound source 414.

The speech frequency band and special environmental sound conditions need not be defined in accordance with human senses. Sensitivity of a dog to a high frequency band is greater than that of a human. The speech frequency band may be set on the high side in the robot 100 too. Also, in order to express sensitivity differing from that of an existing living being such as a human or a dog, an arbitrary speech frequency band and special environmental sound conditions may be defined for the robot 100. For example, a setting can be such that the robot 100 has an extreme dislike of a frequency in a vicinity of 1,000 Hz. Settings of what kind of voice the robot 100 sees as important, what kind of voice surprises the robot 100, what kind of voice the robot 100 dislikes, and what kind of voice the robot 100 favors, define individuality as the robot 100.

Figure 10:
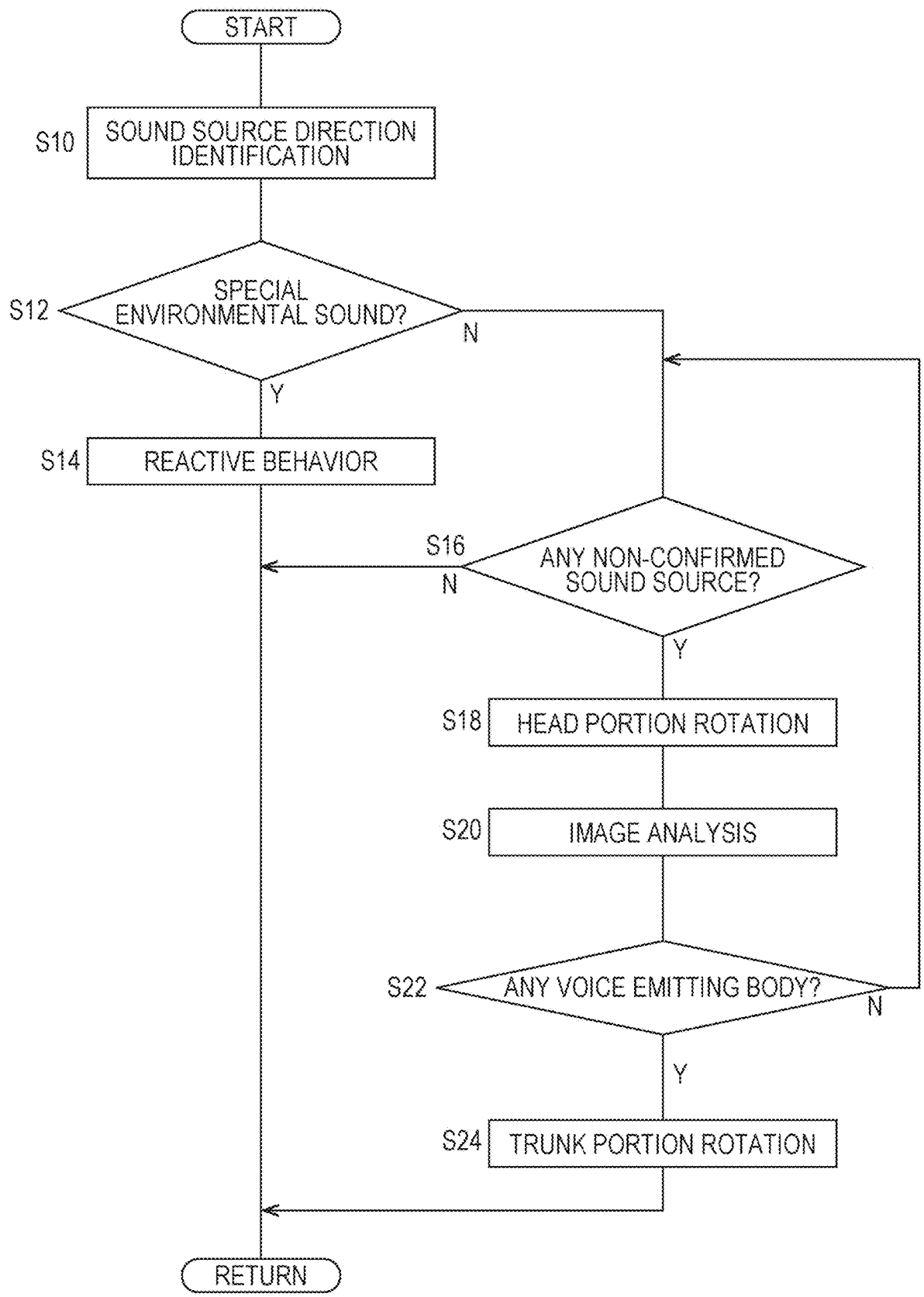
FIG. 10 is a flowchart showing a process when a sound is detected in the embodiment.

FIG. 10 is a flowchart showing a process when a sound is detected in the embodiment.

The flowchart shown in FIG. 10 is executed when the microphone array 404 collects a sound. The recognizing unit 156 detects one or more sound source directions based on voice information collected by each microphone 412 included in the microphone array 404 (S10). Next, the recognizing unit 156 (or the voice categorizing unit 174) determines whether or not the sound is a specific environmental sound based on whether or not the sound includes characteristics satisfying the special environmental sound conditions (S12). This may be determined based on an average value of voice information collected by the multiple of microphones 412 included in the microphone array 404, or when a sound that satisfies the specific environmental sound conditions is detected by a predetermined number or more of the microphones 412, it may be determined that the sound is a specific environmental sound. When the sound is a specific environmental sound (Y in S12), the operation control unit 150 selects a motion (reactive behavior) corresponding to the specific environmental sound, and causes the drive mechanism 120 to execute the motion (S14). As heretofore described, various kinds of motion are selected in accordance with the kind of specific environmental sound.

When the sound is not a specific environmental sound (N in S12), the recognizing unit 156 determines whether or not an unconfirmed sound source not confirmed from an image using the camera 410 exists in the one or more sound source directions detected using the microphone array 404 (S16). When there is no unconfirmed sound source (N in S16), a subsequent process is skipped.

When there are unconfirmed sound sources (Y in S16), the operation control unit 150 directs the head portion of the robot 100 toward one of the unconfirmed sound sources (S18). The recognizing unit 156 sets the filming region 420 in the direction of the unconfirmed sound source in the omnidirectional filming range 418, and carries out image analysis to determine whether or not a voice emitting body exists (S20). When no voice emitting body exists (N in S22), the process returns to S16, and another sound source becomes the target of analysis. When a voice emitting body is detected (Y in S22), the operation control unit 150 directs not only the head portion but also the trunk portion toward the sound source (S24). In the case of the robot 100 in the embodiment, the operation control unit 150 causes the whole of the robot 100 to face the sound source by causing the front wheel 102 to rotate in reverse.

More specifically, when carrying out the image analysis of S20, the direction of the unconfirmed sound source is filmed using the high resolution camera 402, and the existence or otherwise of a voice emitting body is confirmed from the image. At this time, the high resolution camera 402 may be directed toward the unconfirmed sound source by causing the head portion to rotate, or the high resolution camera 402 may be directed toward the unconfirmed sound source by the sensor control unit 172 independently driving the high resolution camera 402. As heretofore described, one or more filming regions 420 corresponding to the sound source direction may be extracted from the omnidirectional filming range 418 of the omnidirectional camera 400, and the existence or otherwise of a voice emitting body may be confirmed.

When confirming the unconfirmed sound source in S16, the recognizing unit 156 (or the voice categorizing unit 174) may take only a sound source in the speech frequency band as a target of analysis by subjecting the voice to frequency filtering. Also, even when a voice emitting body is detected in S22, the process may be returned to S16 rather than advancing to S24 when the lips of the speech emitting body are not moving. More specifically, when a voice emitting body is not a voice emitting body that is moving the lips in a sound detection period, the voice emitting body is not recognized as a voice emission source. In the same way, when a facial image of a voice emitting body is not facing the robot 100, it is assumed that the speech is not speech with respect to the robot 100, and another voice emitting body may be searched for.

After S22, the recognizing unit 156 may confirm whether or not the detected voice emitting body is an appropriate voice emitting body depending on whether the voice emitting body is a heat generating body in a predetermined temperature range, and whether or not the form of the voice emitting body has predetermined characteristics.

According to the process shown in FIG. 10, an animal-like behavioral characteristic of reflexively directing the head portion in the direction of the sound source when a sound is detected can also be expressed by the robot 100. In addition to directing the head portion toward the sound source, a motion expressing interest or surprise, such as directing the eye 110 toward the sound source or giving a start, may be executed. When it is confirmed that the sound source is a voice emitting body, or in other words, when a voice emitting body acting as a voice emission source is identified, adopting a "listening posture" is behaviorally expressed by directing the whole of the body toward the voice emitting body (sound source).

Figure 11:
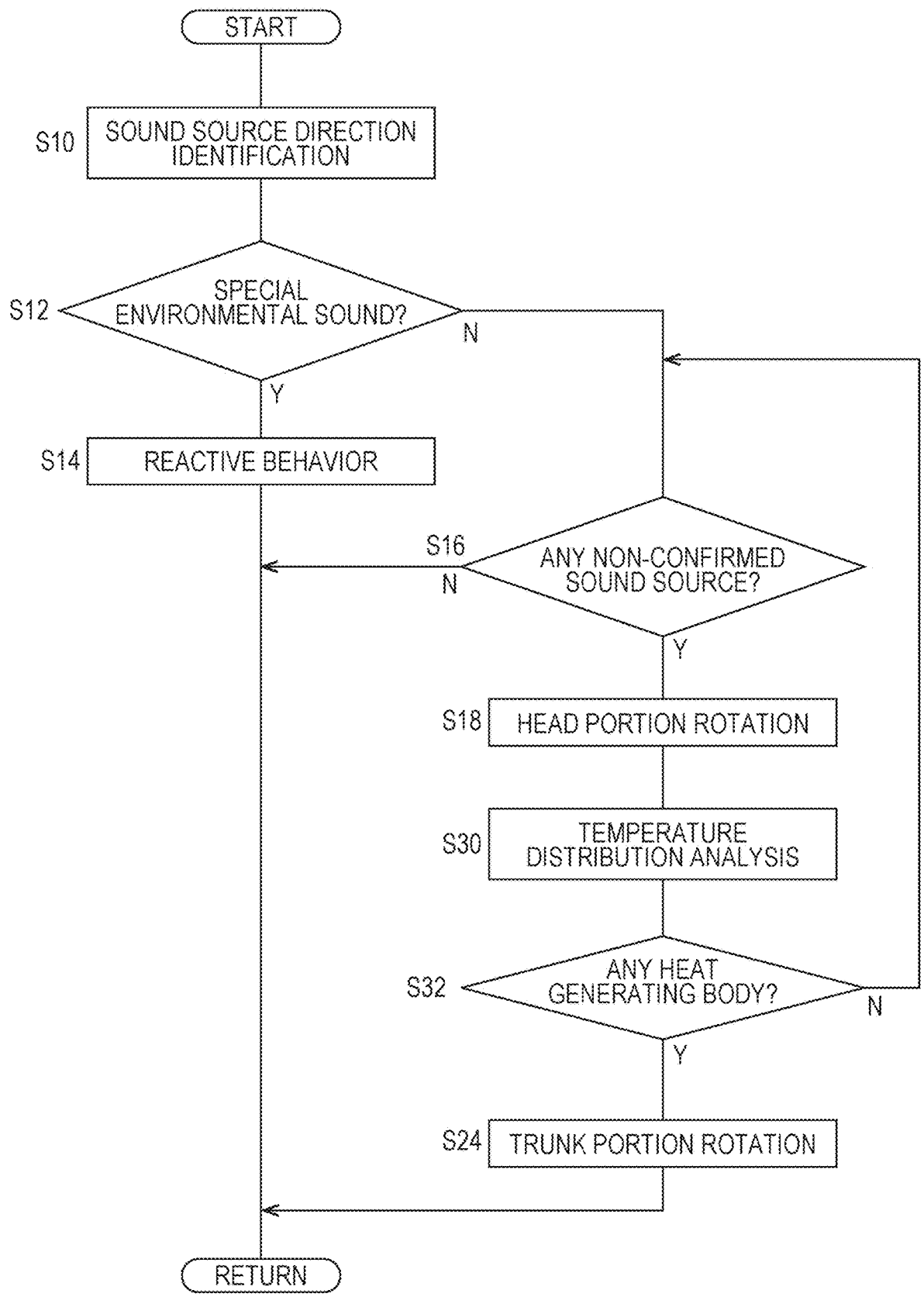
FIG. 11 is a flowchart (a first modified example) showing a process when a sound is detected.

FIG. 11 is a flowchart (a first modified example) showing a process when a sound is detected.

In FIG. 10, whether or not a sound source is a voice emitting body is determined using image analysis. Also, when carrying out image analysis, determination accuracy is increased by adding sensing information from the temperature sensor 406 and the form measuring sensor 408 in addition to checking the lips. A method of identifying a voice emitting body based on temperature analysis, without relying on image analysis, is described in the first modified example shown in FIG. 11. Process details of S10 to S18 and S24 are the same as the details described in relation to FIG. 10.

When there are unconfirmed sound sources (Y in S16), the operation control unit 150 directs the head portion of the robot 100 toward one of the unconfirmed sound sources (S18). The sensor control unit 172 directs the temperature sensor 406 in the direction of the unconfirmed sound source, whereby the temperature distribution in a periphery of the unconfirmed sound source is measured (S30). The recognizing unit 156 is such that when a heat generating body, specifically a heat generating body in the region of the body temperature of a person or a pet (a warm-blooded animal), is measured in the direction of the unconfirmed sound source (Y in S32), the operation control unit 150 directs not only the head portion but also the trunk portion in the direction of the unconfirmed sound source (heat generating body) (S24).

When carrying out the temperature distribution analysis of S32, a measuring direction of the temperature sensor 406 may be set in the direction of the unconfirmed sound source by causing the orientation of the head portion or the trunk portion of the robot 100 to change, rather than by driving the temperature sensor 406. When the temperature sensor 406 is capable of panoramic measurement like the omnidirectional camera 400, adjustment of the measuring direction of the temperature sensor 406 is unnecessary. In addition to the temperature analysis of S30, the kind of image analysis or depth analysis described in relation to FIG. 10 may be additionally executed.

Figure 12:
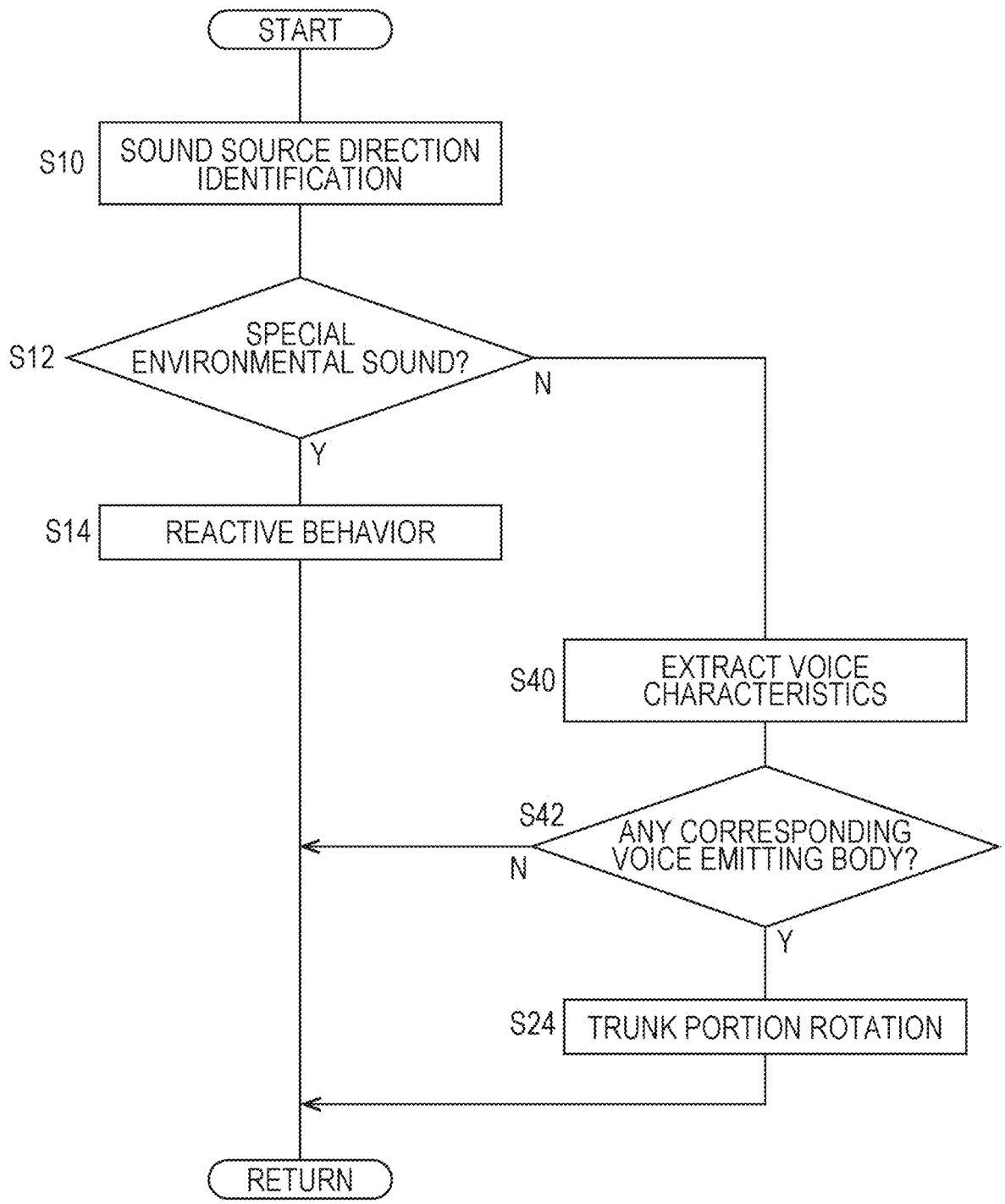
FIG. 12 is a flowchart (a second modified example) showing a process when a sound is detected.
Figure 13:
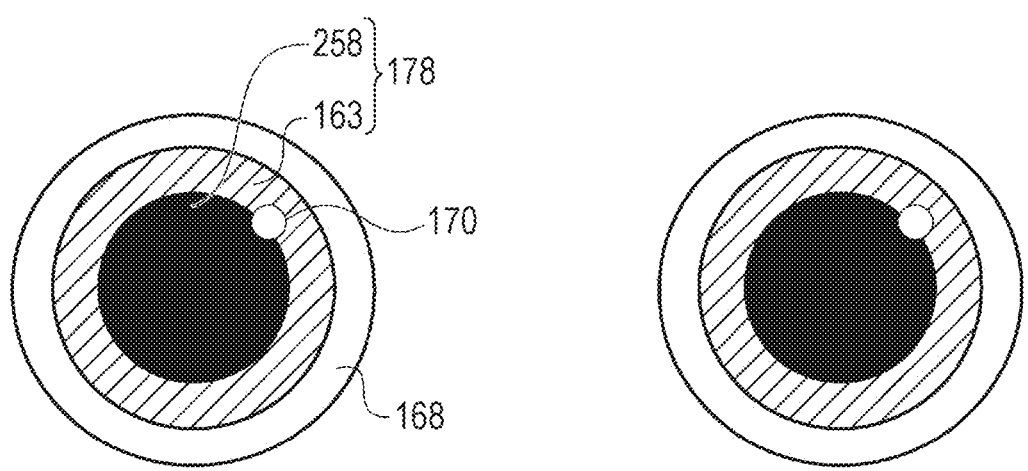
FIG. 13 is an external view of an eye image.

FIG. 12 is a flowchart (a second modified example) showing a process when a sound is detected.

In the second modified example shown in FIG. 12, a voice emitting body is tracked in advance using the omnidirectional camera 400 and the high resolution camera 402, and a voice emission source is identified from among one or more voice emitting bodies forming tracking targets when a sound is emitted. Specifically, the omnidirectional filming range 418 is regularly and intermittently filmed by the omnidirectional camera 400, and the recognizing unit 156 constantly tracks a position in which an object including characteristics of a voice emitting body such as an owner or a pet exists. For example, it is assumed that the "father" exists in a 1 o'clock direction (a direction slightly right of forward) as seen from the robot 100, and the "mother" exists in a 9 o'clock direction (a left direction). More exactly, directions of each a first cluster including the physical and behavioral characteristics of the "father" and a second cluster including the physical and behavioral characteristics of the "mother" are tracked.

Process details of S10 to S14 and S24 are the same as the details described in relation to FIG. 10.

The flowchart shown in FIG. 12 is also executed when the microphone array 404 collects a sound. When the sound is not a specific environmental sound (N in S12), the recognizing unit 156 (or the voice categorizing unit 174) extracts characteristics (sound magnitude, tone, and sound pitch) of the voice (S40). The physical and behavioral characteristics of each owner are registered in advance in the individual data storage unit 218, with the voice characteristics also being registered as one kind thereof. When a voice emitting body corresponding to the extracted voice characteristics is being tracked (Y in S40), the robot 100 changes direction to face the voice emitting body by rotating the trunk portion (S24). When no corresponding voice emitting body exists (N in S40), S24 is skipped. For example, the robot 100 changes direction to the 1 o'clock direction when a sound including the voice characteristics of the "father" is detected, and the robot 100 changes direction to the 9 o'clock direction when a sound including the voice characteristics of the "mother" is detected. Meanwhile, even when a sound resembling voice characteristics of the "eldest son" is detected, the "eldest son" is not being tracked (detected) at the point at which S10 is started, because of which the "eldest son" is processed as a non-detection (N in S42) in this case.

Heretofore, the robot 100 and the robot system 300 including the robot 100 have been described based on the embodiment.

In the same way as a living being, the robot 100 changes behavior in accordance with an external event that is a sound. In the embodiment, the direction of the sound source is detected using the microphone array 404, and the direction of the sound source is confirmed using other sensors such as the camera 410, the temperature sensor 406, and the form measuring sensor 408. Because of this, where the detected sound is emitted, and in particular, where an owner that is speaking to the robot 100 is, is reliably easy to recognize.

Also, the robot 100 can also adopt immediate reactive behavior with respect to a sound that is not a person's voice but draws attention, as does a special environmental sound. Because of this, various kinds of behavioral characteristic of being surprised by and having curiosity about various sounds can be realized.

The robot 100 executes a two-stage action of directing the head when a sound is detected and changing direction when recognizing a voice emitting body there. By realizing differing motions in the two stages of detecting a sound and identifying a voice emitting body, biological behavioral characteristics of subconsciously paying attention and consciously acting can be realized.

The invention not being limited to the heretofore described embodiment or a modified example, components can be changed or embodied without departing from the scope of the invention. Various inventions may be formed by a multiple of the components disclosed in the heretofore described embodiment or the modified example being combined as appropriate. Also, some components may be eliminated from the total of components shown in the heretofore described embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

In the embodiment, a voice and a sound source are sensed using the microphone array 404, the camera 410, the temperature sensor 406, and the form measuring sensor 408, and a recognition process is executed by the recognizing unit 156 of the robot 100. One portion or the whole of the recognition process may be executed by the recognizing unit 212 of the server 200. Also, one portion of the functions of the internal sensor 128 may be mounted in the external sensor 114. For example, an implementation can be such that the camera 410 is mounted in the external sensor 114, image information from the external sensor 114 is analyzed by the server 200, and the robot 100 identifies the position of a voice emitting body based on a result of the analysis.

It has been described that in the embodiment, the head portion is directed toward the sound source when a sound is detected, and the trunk portion is also directed toward the sound source when a voice emitting body is recognized. In addition to this, directing the eye 110 (line of sight) toward the sound source, shaking, escaping, approaching, emitting a voice, and the like are conceivable as motions when a sound is detected. Also, approaching, escaping, closing the eye 110, raising the arm 106, and the like are conceivable as motions when a voice emitting body is recognized.

When detecting vocalization of specific words before identifying the voice emission source after a voice is detected, the robot 100 may interrupt the search for a voice emitting body, and execute an analysis of another unconfirmed sound source. Calls such as "Come here", "Over here", and "Not there" are conceivable as specific words here. For example, it is assumed that the robot 100 detects a multiple of sound sources, and sets a multiple of filming regions 420. When aurally recognizing the specific words "Not there" at a timing of carrying out image analysis on the filming region 420 by directing the face toward a first sound source candidate, the robot 100 changes the target of analysis to a second sound source candidate. Alternatively, the sound source of the specific words may be detected anew, and image analysis carried out in the direction of the sound source of the specific words.

Instead of the microphone array 404 wherein the multiple of microphones 412 are formed into a unit being mounted in the robot 100, the microphone 412 may be disposed in multiple places in the robot 100. In the embodiment, a description has been given assuming that both the omnidirectional camera 400 and the high resolution camera 402 are included, but a configuration may be such that only the omnidirectional camera 400 or only the high resolution camera 402 is mounted. When only the omnidirectional camera 400 is mounted in the robot 100, it is sufficient that the recognizing unit 156 extracts the filming region 420 by cutting out one portion of the omnidirectional filming range 418. When only the high resolution camera 402 is mounted in the robot 100, it is sufficient to film a sound source by causing the filming direction of the high resolution camera 402 to move.

When confirming a voice emitting body, whether or not the voice emitting body is facing the robot 100 may be checked in addition to the lip check. It is thought that when a voice emitting body speaks to the robot 100, the voice emitting body faces the robot 100. When a voice is detected, the voice emitting body that has actually spoken to the robot 100 is correctly detected easily, even when a multiple of voice emitting bodies are detected, by checking whether or not the voice emitting body is facing the robot 100. Whether or not the voice emitting body is facing the robot 100 can be determined using commonly known image recognition technology, such as whether two eyes can be recognized in a facial image.

The robot 100 may be caused in advance to remember a location of an object that is liable to be falsely recognized (hereafter called a "falsely recognized object"), such as audio equipment, a mirror, or a television. Alternatively, the robot 100 may detect a location of audio equipment or the like when carrying out indoor activity, and falsely recognized object coordinates may be registered as one portion of indoor information in the map managing unit 210. When recognizing a location of a falsely recognized object in advance, the robot 100 can eliminate the sound source direction in which the falsely recognized object exists from targets of analysis when a sound is detected, because of which a voice emitting body is more swiftly recognized. Also, when a voice is emitted from a falsely recognized object too, the robot 100 may direct the face toward the falsely recognized object. In this case, while expressing "behavior reacting to a sound", there is no need to carry out image analysis of the falsely recognized object.

In the embodiment, a description has been given assuming that a television is treated as a falsely recognized object. The robot 100 can eliminate a television from emission source candidates using sensing information from the temperature sensor 406, the form measuring sensor 408, and the like. Meanwhile, a situation wherein an owner speaks remotely to the robot 100 at home using a videophone is also envisaged. When considering this kind of situation, it is desirable to set so that the robot 100 adopts reactive behavior toward not only an actual voice emitting body, but also toward a voice emitting body appearing on the television.

When a voice is detected, characteristics of the voice of a person with high familiarity may be searched for with priority. A situation wherein the robot 100 is spoken to by the father and the mother simultaneously will be envisaged. It is assumed that familiarity with respect to the father is higher than familiarity with respect to the mother. At this time, characteristics of each of a multiple of voices are extracted, and of the voice characteristics of the father and the voice characteristics of the mother, a voice coinciding with the voice characteristics of the father is identified first. When a voice coinciding with the voice characteristics of the father is detected, a reaction with respect to a voice emitting body corresponding to the father is executed with priority. According to this kind of control method, a level of priority of voice distinguishing and responsive behavior can be controlled in accordance with familiarity. Behavioral characteristics of reacting with maximum priority only to the voice of an owner with high familiarity are realized.

A configuration may be such that movement of the lips is checked only when the robot 100 and a voice emitting body are within a predetermined distance. Also, an image may be recorded by the omnidirectional camera 400, and when a voice is detected, a voice emitting body whose lips are moving, or that is facing the robot 100, at the detection timing may be confirmed using the recorded image.

In the embodiment, a description has been given assuming that a special environmental sound is a sound that surprises the robot 100, or a sound that evokes the curiosity of the robot 100, but in addition to this, a sound that the robot 100 favors may be defined. For example, a sound of a violin, a composition of classical music, rock music, or the like, or the voice of a specific singer may be set as a "pleasant sound", and various motions, for example, a motion expressing pleasure, may be executed when a pleasant sound is heard too.

Motion selection in the embodiment may be executed on a probability basis. For example, when a voice emitting body is recognized, there is a high probability of the robot 100 facing the voice emitting body, but there may also be a possibility of the robot 100 ignoring the voice emitting body without facing the voice emitting body. Also, a configuration may be such that there is a high probability of the robot 100 facing the voice emitting body when the voice emitting body is of high familiarity, and a low probability of the robot 100 facing the voice emitting body when the voice emitting body is of low familiarity.

A reaction with response to a special environmental sound need not always be the same. For example, when a large sound of construction work is recognized, the robot 100 may select a motion of moving away from the sound source the first time, but the motion selection may subsequently be changed to approaching the sound source, not reacting, or the like.

In the embodiment, a description has been given with reliably recognizing a "voice emission source" formed by a "voice emitting body (living being)" as an object, but not being limited to a voice emitting body, the embodiment is also effective in recognizing a "sound emission source" that also includes an inanimate object. For example, when a voice of a television is detected, a method of confirming the sound source from an image or the like, as in the embodiment, is also effective in reliably identifying the direction of the television.

In this case too, when the direction of a sound source is detected by the microphone array 404, the robot 100 may direct the head portion in the detected direction, and when the sound source is confirmed using an image or the like, the robot 100 may direct the trunk portion in the direction of the sound source.

When the voice categorizing unit 174 detects a predetermined category, such as a special environmental sound, a scream, an explosive sound, a breaking sound, or an ultrasonic wave, the robot 100 may execute a predetermined motion before identifying the sound source using an image, a form, a heat distribution, or the like, or without identifying the sound source. A predetermined motion here can be arbitrarily defined in advance as a motion acting as a reaction to a sound. This kind of processing method is such that when a voice that should particularly evoke caution is detected, a motion indicating surprise or the like can be executed immediately, without waiting for the result of the sound source direction identification process.

The voice emitting body tracking described in relation to FIG. 12 is such that there is no need to constantly recognize the direction in which the voice emitting body exists using a filmed image. For example, when the position of a voice emitting body is detected using the camera 410 of the robot 100 or using the external sensor 114, the position managing unit 208 of the server 200 records the positional coordinates of each voice emitting body in a map as necessary. When a voice is detected in this state, the robot 100 may identify the voice emitting body by referring to the map.

Additional Examples

In the embodiment, a description has been given assuming that one or more sound emitting bodies are identified by the microphone array 404, and the true voice emission source (sound source) is identified using image recognition or the like.

The microphone array 404 and the recognizing unit 156 may identify a solitary sound source direction and reliability with respect to the sound source direction. A method such that after one sound source direction is identified using a detection signal from the microphone array 404, reliability of the sound source direction is calculated is commonly known. For example, the recognizing unit 156 may set reliability with respect to a sound source direction to be higher the greater the sound volume. Also, when a multiple of sound emitting bodies are identified simultaneously, reliability may be calculated in accordance with a sound volume ratio detected from each sound emitting body, instead of identifying the direction in which the sound emitting body with the greater sound volume exists as the sound source direction. For example, when a ratio between the sound volume from a sound source direction D1 and the sound volume from a sound source direction D2 is 4:1, the recognizing unit 156 may calculate assuming that "the sound source direction D1 reliability is 80% (=4/(4+1)×100)".

In the robot system 300 of an additional example, the data processing unit 202 of the server 200 includes an emotion managing unit in addition to the position managing unit 208, the map managing unit 210, the recognizing unit 212, the operation control unit 222, and the familiarity managing unit 220.

The emotion managing unit manages various emotion parameters indicating emotions (loneliness, curiosity, a desire for recognition, and the like) of the robot 100. The emotion parameters are constantly fluctuating. An importance of the multiple of action maps changes in accordance with the emotion parameters, the movement target point of the robot 100 changes depending on the action maps, and the emotion parameters change in accordance with movement of the robot 100 and the passing of time.

For example, when the emotion parameter indicating loneliness is high, the emotion managing unit sets the weighting coefficient of the action map that evaluates places in which the robot 100 feels at ease to be high. When the robot 100 reaches a point in the action map at which loneliness can be eliminated, the emotion managing unit reduces the emotion parameter indicating loneliness. Also, each kind of emotion parameter also changes in accordance with a responsive action. For example, the emotion parameter indicating loneliness decreases when the robot 100 is "hugged" by an owner, and the emotion parameter indicating loneliness gradually increases when the robot 100 does not visually recognize an owner for a long time.

The internal sensor 128 of the robot 100 may further include an acceleration sensor. The recognizing unit 156 may recognize that the robot 100 is picked up and hugged, put down from a hug, or dropped, using the acceleration sensor.

The data processing unit 136 of the robot 100 includes a pupil control unit in addition to the recognizing unit 156, the operation control unit 150, the sensor control unit 172, and the voice categorizing unit 174. The pupil control unit generates an eye image (to be described hereafter), and causes the eye image to be displayed in the eye 110.

The eye 110 of the robot 100 is formed as a display on which the eye image 176 is displayed. The pupil control unit generates the eye image 176 including a pupil image 178 and a peripheral edge image 168. The pupil control unit causes the eye image 176 to be displayed as a moving image. Specifically, the line of sight of the robot 100 is expressed by moving the pupil image 178. Also, a blinking operation is executed at a predetermined timing. The pupil control unit expresses a large variety of movements of the eye image 176 in accordance with various operation patterns. A monitor of the eye 110 desirably has a curved surface form, in the same way as a human eyeball.

The pupil image 178 includes a pupillary region 258 and a corneal region 163. Also, a catch light 170 for expressing a reflection of external light is also displayed in the pupil image 178. Rather than shining owing to a reflection of external light, the catch light 170 of the eye image 176 is an image region expressed as a high-luminance region by the pupil control unit.

The pupil control unit causes the pupil image 178 to move vertically and horizontally on the monitor. When the recognizing unit 156 of the robot 100 recognizes a moving object, the pupil control unit expresses a "gaze" of the robot 100 by directing the pupil image 178 toward the moving object.

The pupil control unit not only moves the pupil image 178 relative to the periphery image 168, but can also represent a half-closed eye or a closed eye by causing an eyelid image to be displayed. The pupil control unit may represent an aspect of the robot 100 sleeping using a closed eye display, or may represent an aspect of the robot 100 being in a half-asleep state, that is, a state of nodding off to sleep, by covering three-quarters of the eye image 176 with the eyelid image, then shaking the eyelid image.

Sound Memory

A voice and an "impression" of the voice may be correlated. Specifically, the recognizing unit 212 (or the recognizing unit 156) may categorize a certain voice as a "positive sound" or a "negative sound" in accordance with an event occurring within a predetermined time, within around five seconds for example, from the voice being detected. Firstly, a positive event and a negative event are registered in advance. A positive event is defined as a pleasant action such as being stroked or being hugged. A positive event may be visually recognizing a user whose familiarity is of a predetermined value or greater (a person the robot 100 likes). When a positive event is detected within the predetermined time from a certain voice pattern S1 being detected, the recognizing unit 212 registers the voice pattern S1 as a "positive sound".

A negative event is defined as an unpleasant action such as being hit or being dropped. A negative event may be visually recognizing a user whose familiarity is of a predetermined value or less (a person the robot 100 dislikes). A negative event may be a signal of a predetermined volume or greater being detected by the various kinds of sensor, such as a physical shock, a voice of a predetermined volume or greater (for example, a sound of thunder), or light of a predetermined volume or greater (for example, a flash). When a negative event is detected within the predetermined time from a certain voice pattern S2 being detected, the recognizing unit 212 registers the voice pattern S2 as a "negative sound".

When neither a positive event nor a negative event occurs within the predetermined time from a voice pattern S3 being detected, the recognizing unit 212 registers the voice pattern S3 as a "neutral sound".

When a voice is detected, the recognizing unit 156 compares the voice with previously experienced voice patterns. When the voice is a non-experienced voice pattern, the operation control unit 150 executes a predetermined motion such as approaching, moving away, or directing the line of sight. When the voice is a previously experienced voice pattern, the operation control unit 150 need not execute a motion such as approaching or moving away. For example, when the voice pattern S3 (a non-experienced neutral sound) is detected for the first time, the operation control unit 150 executes a motion of moving away from the sound source direction. Further, when the voice pattern S3 (a previously experienced neutral sound) is detected for the second time, the operation control unit 150 directs the head in the sound source direction, or directs the line of sight although the robot 100 does not move. According to this kind of control method, behavioral characteristics of "becoming accustomed to a sound" can be expressed. Even in the case of a special environmental sound, control such that the robot 100 is surprised the first time but not surprised from the second time onward is realized when the sound is a neutral sound.

The same applies when the voice pattern S1 (a positive sound) is detected for the second time onward. When the voice pattern S1 (a non-experienced positive sound) is detected for the first time, the operation control unit 150 executes a motion of moving a little away from the sound source direction. Subsequently, when a positive event occurs, the recognizing unit 212 registers the voice pattern S1 as a positive sound. When the voice pattern S1 (a previously experienced positive sound) is detected for the second time, the operation control unit 150 executes a motion of approaching the sound source direction. According to this kind of control method, behavioral characteristics of actually favoring the voice pattern S1 owing to a positive event being associated with the voice pattern S1 can be expressed, even in the case of a special environmental sound. For example, when having an experience such that an owner with high familiarity appears when a bell in the hall rings, control such that the robot 100 approaches the hall when hearing the bell can be carried out.

The same applies when the voice pattern S2 (a negative sound) is detected for the second time onward. When the voice pattern S2 (a non-experienced negative sound) is detected for the first time, the operation control unit 150 executes a motion of moving a little away from the sound source direction. Subsequently, when a negative event occurs, the recognizing unit 212 registers the voice pattern S2 as a negative sound. When the voice pattern S2 (a previously experienced negative sound) is detected for the second time, the operation control unit 150 executes a motion of moving a considerable way away from the sound source direction. According to this kind of control method, behavioral characteristics such that an unpleasant memory is linked to a voice can be expressed. For example, when a thunderclap (a negative event) occurs after a sound of rumbling thunder (the voice pattern S2), the robot 100 remembers the sound of rumbling thunder as a negative sound. As a result of this, when the sound of rumbling thunder is heard, behavior of escaping to the back of a room can be expressed, even before a thunderclap actually occurs.

A magnitude of a positive or negative impression with respect to a voice may be quantified as a parameter (hereafter called "positivity"). Positivity changes in a range of +100 (positive) to −100 (negative). When a positive event occurs within the predetermined time after an occurrence of a certain voice pattern S4, the recognizing unit 212 adds to the positivity with regard to the voice pattern S4. Meanwhile, when a negative event occurs, the recognizing unit 212 subtracts from the positivity with regard to the voice pattern S4. By repeating this kind of control, the positivity with respect to a voice may be caused to change in accordance with experience. By defining an impression with respect to a voice in accordance with the voice and a subsequently occurring event, the robot 100 can be caused to recognize a "causality" between the voice and the event.

Sound Selection

The microphone array 404 constantly detects an external sound. The recognizing unit 156 may identify the sound source direction (voice emission source) by utilizing the camera 410 every time a voice is detected, but when this kind of process is continued, there is also a possibility of the processing load increasing. In an additional example, the robot 100 ignores a large number of external sounds in order to utilize a calculation capacity of the processor 122 effectively, and to save power. When a predetermined "warning condition" is satisfied, the recognizing unit 156 accurately identifies the sound source direction by utilizing the camera 410 or the temperature sensor 406.

It is sufficient that a designer arbitrarily sets a warning condition as a situation in which the voice emission source should be identified. For example, a warning condition is satisfied when a stationary state of the robot 100 continues for a predetermined time or longer, and when a voice is detected in this case, the sound source direction may be accurately identified by also using image recognition or the like. Alternatively, a warning condition may be assumed to be satisfied when a soundless state continues for a predetermined time or longer, when a voice of a predetermined value or greater is detected, when attempting to start movement from a stationary state, or the like. By a warning condition being set, the robot 100 no longer reacts oversensitively to all voices. Insensitivity of the robot 100 can be regulated by a warning condition.

Regardless of the existence or otherwise of a warning condition, the robot 100 may cause an "interest" with respect to a "sound emitting body" to change in accordance with reliability. In an additional example, as heretofore described, the recognizing unit 156 calculates reliability together with the sound source direction with respect to a voice detected by the microphone array 404. The operation control unit 150 does not select any special motion when reliability is a first threshold (for example, less than 20%). In other words, the robot 100 does not show interest in a voice whose sound source direction is not clear.

When reliability is equal to or greater than the first threshold and less than a second threshold (for example, 20% or greater, less than 40%), the pupil control unit expresses a "slight interest" by moving the pupil image 178 in the sound source direction. When reliability is equal to or greater than the second threshold and less than a third threshold (for example, 40% or greater, less than 60%), the operation control unit 150 expresses a "medium degree of interest" by causing the head portion frame 316 to rotate, thereby directing the face of the robot 100 in the sound source direction. When reliability is equal to or greater than the third threshold, the operation control unit 150 may express a stronger interest by causing the body 104 to rotate, thereby directing the whole body of the robot 100 in the sound source direction.

The recognizing unit 156 may cause the first threshold to the third threshold to change in accordance with an emotion parameter or the like. For example, when the emotion parameter indicating curiosity is of a predetermined value or greater, or when the robot 100 is in a stationary state, the recognizing unit 156 may lower each threshold. Also, in another situation in which interest is liable to be attracted, such as when the emotion parameter indicating curiosity is of a predetermined value or less, or when a user with high familiarity is visually recognized, the recognizing unit 156 may raise each threshold. According to this kind of control method, a situation in which interest is liable to be held in a sound, and a situation in which interest is unlikely to be held, can be expressed.

The invention claimed is:

1. A robot, comprising:
   a microphone configured to receive at least one audio signal;
   a non-transitory computer readable medium configured to store instructions thereon; and
   a processor connected to the non-transitory computer readable medium, wherein the processor is configured to execute the instructions for:
   receiving information for each object of a plurality of objects;
   recognizing an object of the plurality of objects associated with each audio signal of the received at least one audio signal;
   updating information associated with the recognized object based on the received at least one audio signal;
   determining a priority of the recognized object among the plurality of objects, in response to the at least one audio signal comprising a plurality of audio signals, based on the updated information;
   selecting a response for execution by the robot based on the determined priority and the at least one audio signal;
   determining a direction of the received at least one audio signal;
   controlling an image displayed in the robot; and
   selecting the response of causing the image to move in the determined direction.

2. The robot according to claim 1, wherein the information comprises a characteristic of the recognized object.

3. The robot according to claim 1, wherein the information comprises an attribute of the recognized object.

4. The robot according to claim 1, wherein the information comprises a familiarity of the recognized object.

5. The robot according to claim 4, wherein the processor is configured to execute the instructions for selecting the response in response to the received at least one audio signal of the recognized object having a highest priority among the plurality of objects.

6. The robot according to claim 1, wherein the processor is configured to execute the instructions for selecting the response for searching for the recognized object having a higher priority before searching for the recognized object having a lower priority.

7. The robot according to claim 6, wherein the processor is configured to execute the instructions for determining a direction of the received at least one audio signal, and searching for the recognized object based on the determined direction.

8. The robot according to claim 1, wherein the processor is configured to execute the instructions for selecting the response toward the recognized object based on the determined direction.

9. The robot according to claim 1, wherein the processor is configured to execute the instructions for selecting the response by directing a portion of the robot toward the recognized object based on the determined direction.

10. The robot according to claim 1, wherein the image comprises a pupil image displayed in an eye of the robot.

11. The robot according to claim 1, wherein the processor is configured to execute the instructions selecting the response of moving in the determined direction.

12. The robot according to claim 1, wherein the processor is configured to execute the instructions for determining impression information based on a detected event occurring within a predetermined time period after receiving the at least one audio signal.

13. The robot according to claim 12, wherein the processor is configured to execute the instructions for selecting the response based on the determined impression information.

14. The robot according to claim 1, wherein the processor is configured to execute the instructions for selecting the response by outputting a sound based on the recognized object.

15. A robot, comprising:
    a microphone configured to receive audio signals;
    a non-transitory computer readable medium configured to store instructions thereon; and
    a processor connected to the non-transitory computer readable medium, wherein the processor is configured to execute the instructions for:
    identifying a first object associated with a first audio signal of the received audio signal;
    identifying a second object associated with a second audio signal of the received audio signal;
    determining whether the first object has a higher priority than the second object;
    selecting a first response for execution by the robot in response to the first object having a higher priority than the second object;
    selecting a second response for execution by the robot in response to the second object having a higher priority than the first object;
    determining a direction of the received first audio signal;
    controlling an image displayed in the robot; and
    selecting the first response of causing the image to move in the determined direction; and
    transmitting instructions for executing only one of the first response or the second response.

16. The robot according to claim 15, wherein the image comprises a pupil image displayed in an eye of the robot.

17. The robot according to claim 15, wherein the processor is configured to execute the instructions selecting the response of moving in the determined direction.

18. A robot, comprising:
    a microphone configured to receive at least one audio signal;

a non-transitory computer readable medium configured to store instructions thereon; and a processor connected to the non-transitory computer readable medium, wherein the processor is configured to execute the instructions for:

recognizing an object of a plurality of objects associated with each audio signal of the received at least one audio signal;

updating information associated with the recognized object based on the received at least one audio signal;

determining a priority of the recognized object among the plurality of objects, in response to the at least one audio signal comprising a plurality of audio signals, based on the updated information;

selecting a response for execution by the robot based on the determined priority and the at least one audio signal;

determining a direction of the received at least one audio signal; and selecting the response of causing an image displayed in the robot to move in the determined direction.

19. The robot according to claim 18, wherein the image comprises a pupil image displayed in an eye of the robot.

20. The robot according to claim 18, wherein the processor is configured to execute the instructions selecting the response of moving in the determined direction.

\* \* \* \* \*